United States Patent
Mundon et al.

(10) Patent No.: US 10,767,617 B2
(45) Date of Patent: Sep. 8, 2020

(54) SURVIVABILITY OF WAVE ENERGY CONVERTORS

(71) Applicant: Oscilla Power, Inc., Seattle, WA (US)

(72) Inventors: Timothy R Mundon, Seattle, WA (US); Brian Rosenberg, Seattle, WA (US); Andrew Gill, Seattle, WA (US); Ben Ackers, Seattle, WA (US); Ian McCauley, Brier, WA (US); Ken Fitzgerald, Vashon, WA (US)

( * ) Notice: Subject to any disclaimer, the term of this patent is extended or adjusted under 35 U.S.C. 154(b) by 0 days.

(21) Appl. No.: 16/399,989

(22) Filed: Apr. 30, 2019

(65) Prior Publication Data

US 2019/0331085 A1  Oct. 31, 2019

Related U.S. Application Data

(60) Provisional application No. 62/664,489, filed on Apr. 30, 2018.

(51) Int. Cl.
*E02B 9/08* (2006.01)
*F03B 13/12* (2006.01)
*F03B 13/18* (2006.01)
*F03B 15/00* (2006.01)

(52) U.S. Cl.
CPC .......... *F03B 13/1895* (2013.01); *F03B 15/00* (2013.01); *F05B 2270/18* (2013.01)

(58) Field of Classification Search
CPC ... F03B 13/1895; F03B 15/00; F05B 2270/18
See application file for complete search history.

(56) References Cited

U.S. PATENT DOCUMENTS

| 7,632,041 | B2 * | 12/2009 | Jean | E02B 9/08 405/76 |
| 9,656,728 | B2 * | 5/2017 | Mundon | B63B 22/20 |
| 10,352,291 | B2 * | 7/2019 | Nair | |
| 10,393,089 | B2 * | 8/2019 | Mundon | H01L 41/125 |
| 2008/0146103 | A1 * | 6/2008 | Gerber | B63B 22/00 441/100 |
| 2010/0025993 | A1 * | 2/2010 | Raftery | F03B 13/1885 290/42 |
| 2011/0113771 | A1 * | 5/2011 | Foster | F03B 13/189 60/501 |
| 2012/0247096 | A1 * | 10/2012 | Gerber | F03B 13/1855 60/496 |
| 2012/0285544 | A1 * | 11/2012 | Westby | F03B 13/1885 137/1 |
| 2013/0234442 | A1 | 9/2013 | Garrido Garcia et al. | |
| 2013/0341927 | A1 * | 12/2013 | Murphree | F03B 13/20 290/53 |
| 2014/0145442 | A1 * | 5/2014 | Hart | F03B 13/18 290/53 |
| 2017/0002789 | A1 * | 1/2017 | Nair | F03C 1/00 |
| 2017/0009732 | A1 * | 1/2017 | Mundon | F03B 13/189 |

(Continued)

FOREIGN PATENT DOCUMENTS

WO  2017015626  1/2017

*Primary Examiner* — Benjamin F Fiorello
(74) *Attorney, Agent, or Firm* — Intellectual Strategies

(57) ABSTRACT

A wave energy conversion (WEC) system includes a float body, a heave plate, a tether, and a controller. The tether couples the heave plate to the float body. The controller controls the tether between survivability modes. Each survivability mode adjusts a tension and/or length of the tether.

10 Claims, 18 Drawing Sheets

(56) References Cited

U.S. PATENT DOCUMENTS

| | | | |
|---|---|---|---|
| 2017/0226984 A1* | 8/2017 | Gregory | F03B 13/1895 |
| 2018/0111665 A1* | 4/2018 | Tsao | F03B 17/06 |
| 2018/0306164 A1* | 10/2018 | Lehmann | F03B 13/187 |
| 2019/0120201 A1* | 4/2019 | Dragic | F03B 13/1845 |
| 2019/0145373 A1* | 5/2019 | Lehmann | F03B 13/148 |

* cited by examiner

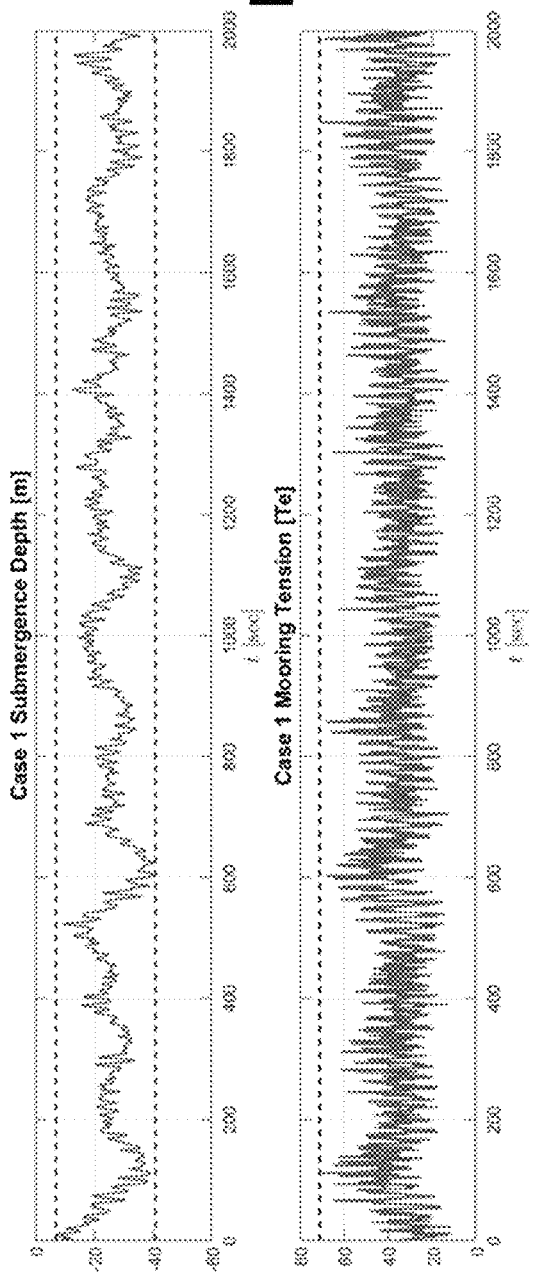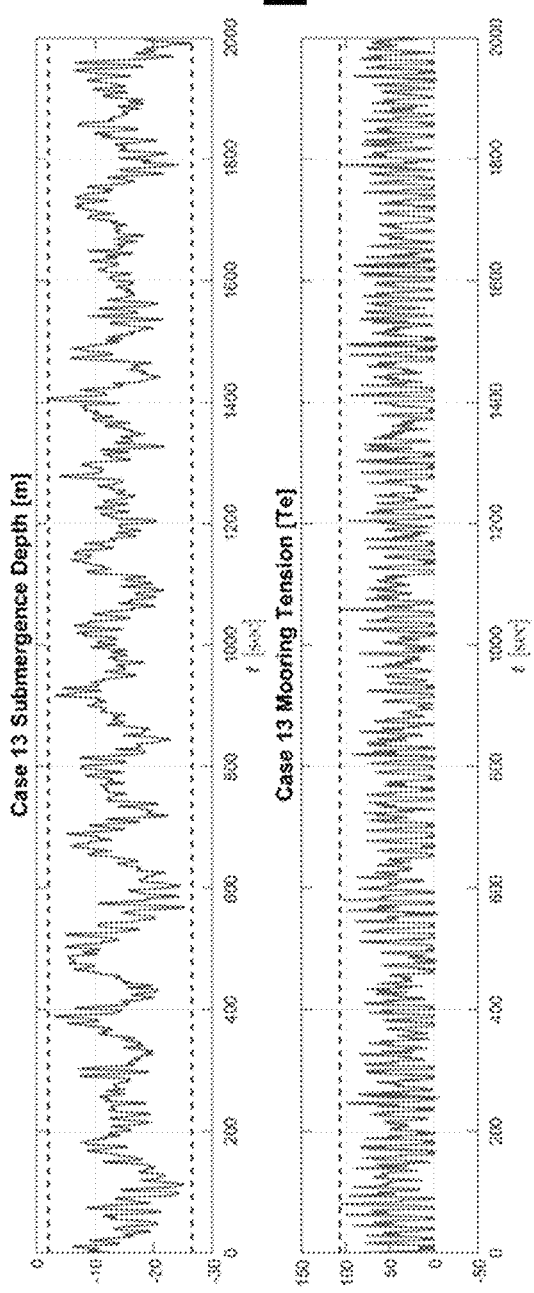

SURVIVABILITY OF WAVE ENERGY CONVERTORS

CROSS-REFERENCE TO RELATED APPLICATIONS

This application claims the benefit of U.S. Provisional Application No. 62/664,489, filed on Apr. 30, 2018, which is incorporated by reference herein in its entirety.

STATEMENT OF FEDERALLY SPONSORED RESEARCH

This invention was made with Government support under DOE EERE DE-EE0007346. The Government has certain rights to this invention.

SUMMARY

Embodiments of a system are described. In one embodiment, the system is a wave energy converter (WEC) system. The wave energy conversion (WEC) system includes a float body, a heave plate, a tether, and a controller. The tether couples the heave plate to the float body. The controller controls the tether between survivability modes. Each survivability mode adjusts a tension and/or length of the tether. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 12A depicts one embodiment of wave diagrams for design simulations of the deployment arrangement shown in FIG. 10.

FIG. 12B depicts one embodiment of wave diagrams for design simulations of the deployment arrangement shown in FIG. 11.

Throughout the description, similar reference numbers may be used to identify similar elements.

DETAILED DESCRIPTION

Figure 1:
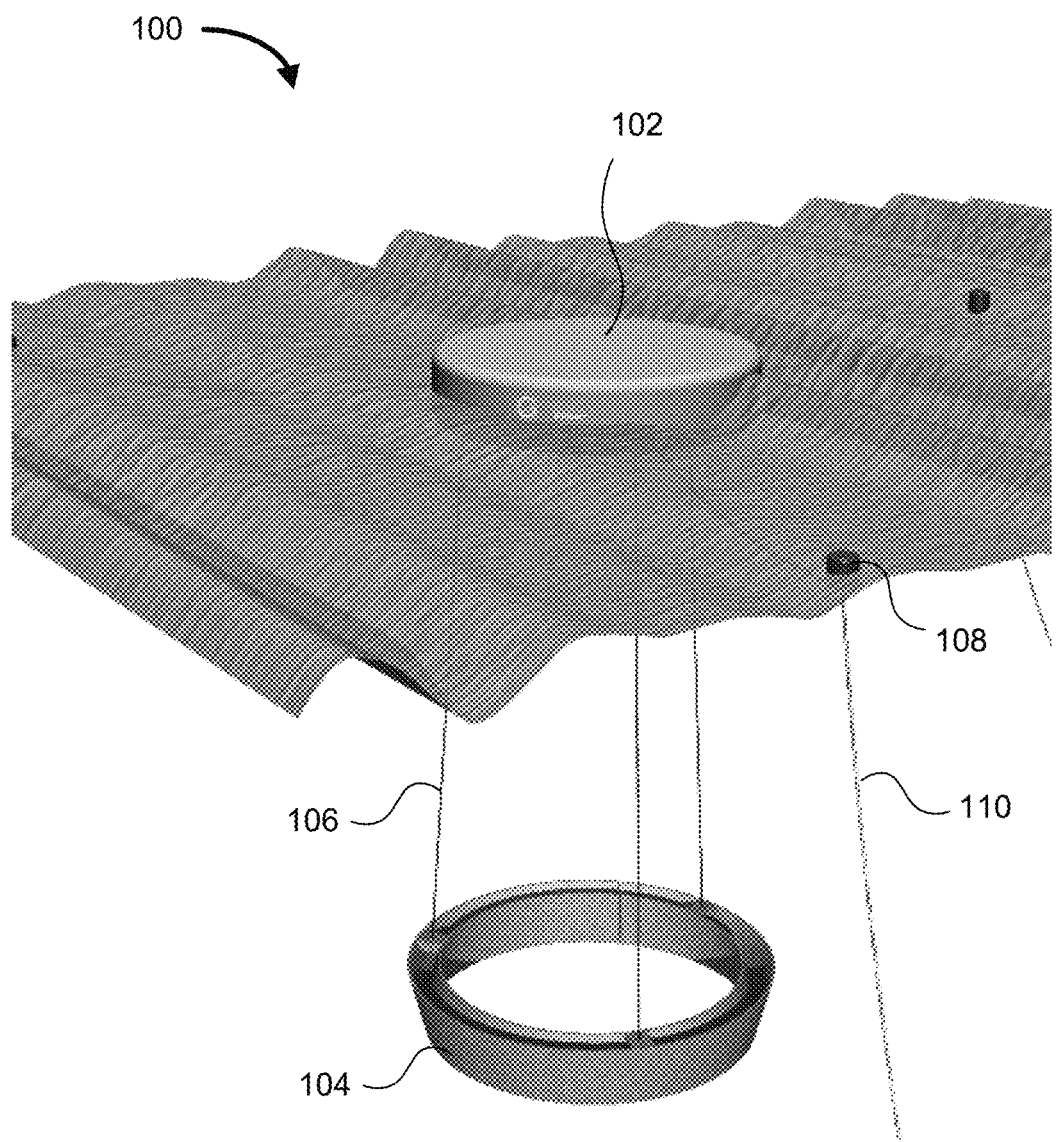
FIG. 1 depicts a schematic diagram of one embodiment of wave energy converter.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Reference to a computer readable medium may take any physical form capable of storing machine-readable instructions, at least for a time in a non-transient state, on a digital processing apparatus. A computer readable medium may be embodied by a compact disk, digital-video disk, a Blu-ray disc, a magnetic tape, a Bernoulli drive, a magnetic disk, flash memory, integrated circuits, or other digital processing apparatus memory device.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

An overarching consideration for any ocean wave energy convertor (WEC), including the Triton WEC from Oscilla Power, Inc. (OPI), is to ensure survivability in all expected ocean conditions, including extreme waves. (The designation "Triton" refers to a specific WEC or class of WECs.) This disclosure describes embodiments of survival configurations for OPI's Triton device and similar types of devices that include methods such as 1) submergence of the surface float, and/or 2) retraction of the heave plate and mechanical coupling to the surface float, in order to effectively behave as a one-body system in extreme waves. In some embodiments, approaches described herein reduce the structural load capacity needed for survival. Further, embodiments of a method are described to identify thresholds for transition into survival configurations.

Design for survival is a key consideration for any WEC. In some deployments, a WEC located at an energetic site, with an average energy of around 40 kW/m, may be expected to experience extreme events with an incident energy of more than 2 MW/m. In such an event, the WEC might manage this energy flux either through dissipation or through detuning by way of a structural reconfiguration. Major reconfiguration of point absorbers with rigidly attached reaction structures is not practical, thus they are typically overdesigned for survival. Survival loads can be many tens of times higher than mean loads during normal operation, making this overdesign expensive.

Limiting the extent of these extreme loads by reconfiguring the device to reduce and limit wave response (i.e., a "survival configuration") can considerably lower the structural costs associated with connections, hull and reaction structure. As extreme waves are generally associated with major storms, such a configuration can be initiated automatically in advance, with power production sacrificed in favor of system survival.

There has been much discussion on the particular return period to be used for extreme waves in the design of wave energy devices. The conventional approach for oil and gas (O&G) projects is to design for a 1:100 year event or possibly higher, which obviously results in higher system costs than designing for a lower period, such as 1:25 or 1:50 years. Importantly, however, there are key differences in consequence between conventional O&G projects and wave energy devices (primarily due to resident personnel and pollution risk) that may mean that a shorter return period can be justified for WECs. The offshore wind industry currently specifies a 1:50 year return period (IEC TC-88), and although there have been questions about whether this is adequate to address the additional hurricane risk faced in the US, the majority of wave energy sites are located on the US West coast, which has a lower risk of hurricanes. Accordingly, it is appropriate to apply a 1:50 year return period to the design of the Triton WEC.

FIG. 1 depicts a schematic diagram of one embodiment of wave energy converter (WEC) system 100. The illustrated WEC system 100 includes a float body 102, a heave plate 104, and one or more tethers 106 connecting the heave plate 104 to the float body 102. In some embodiments, the float body 102 is configured to float at a surface of a body of water. In other embodiments, the float body 102 is configured to be submerged below the surface of the body of water, as described in more detail herein. In further embodiments, the float body 102 is also coupled to on or more mooring floats 108 and corresponding mooring lines 110.

In one embodiment, the WEC system 100 is a two-body point absorber having a large surface float 102 connected by flexible tethers 106 to a submerged heave plate 104. As surface waves excite the float 102, it reacts against the heave plate 104, generating tension changes in the tethers 106. These tension changes are conditioned and applied as amplified, compressive forces to electrical generators such as magnetostrictive generators or other forms of generating devices, which translate the low displacement, high force inputs into electrical power.

Other embodiments of wave energy converters may employ heave plates in a variety of strategies. One common approach has been to integrate the plate into a larger spar structure that is closely coupled to a floating object that moves relative to the spar. This relative motion is typically used to drive an electromagnetic or hydraulic generator. Traditional WEC heave plates are generally designed to maximize platform (drag) area or inertia (mass) as key design parameters, and thus are large, heavy and expensive. In addition, the support structures to ensure effective operation in these designs are also expensive for similar reasons.

Heave plates connected to surface floats with flexible tethers have not previously been used in WECs. This is due principally to concerns with snap loading of the tethers. However, embodiments described herein are able to largely eliminate these concerns through extensive modeling and hardware testing. Embodiments of heave plate designs described herein improve upon the reliability/cost tradeoff of traditional designs, enabling a cost structure that can be made competitive with offshore wind.

Figure 2:
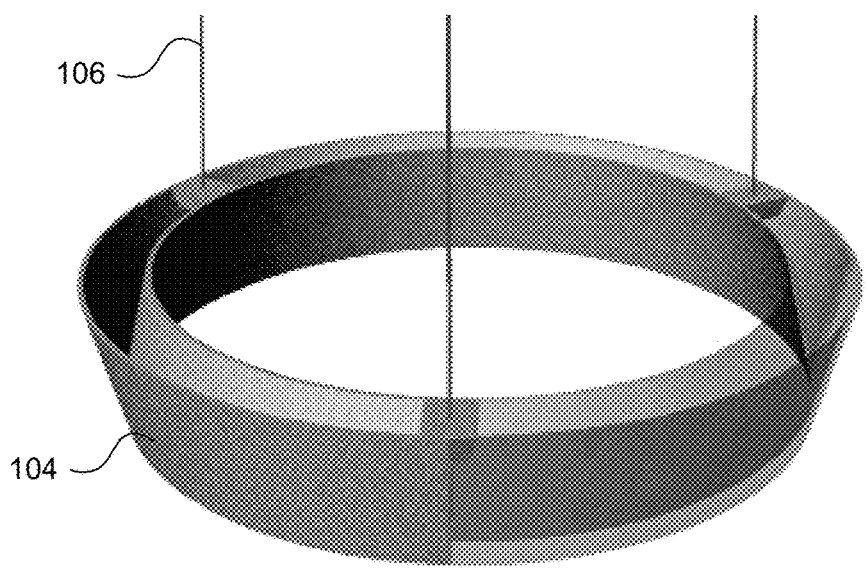
FIG. 2 depicts a schematic design of one embodiment of an asymmetric heave plate.

FIG. 2 depicts a schematic design of one embodiment of an asymmetric heave plate 103. All WEC designs have a characteristic or optimal force/displacement profile that enables maximum mechanical energy capture and system efficiency in each wave condition; however, the magnitudes of the force and displacement are system dependent. With a traditional fixed heave plate, resistance might be maximized in both the upward and downward directions to provide sufficient force to the energy conversion system. In one embodiment, the asymmetric heave plate 104 has the potential to enable improvements in performance and cost for both new and traditional WECs. Initial tank and ocean testing of the concept has been carried out, and preliminary results have been promising in terms of both achieving reasonable levels of power production and indicating that there is room for improvement or optimization. Modeling has shown that reductions in mass and peak loads in extreme events are possible through improvement or optimization of heave plate asymmetry and tether architecture. In addition, the use of flexible tethers to connect the heave plate and surface float allows for survival mode configurations that can enhance survivability under extreme waves, and thus reduce installed capital costs.

Figure 3:
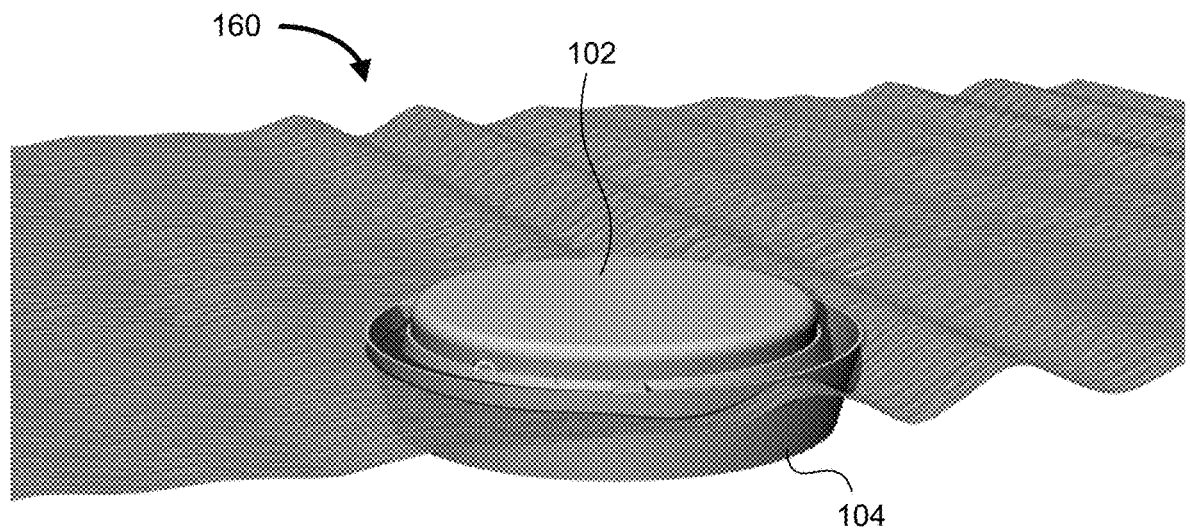
FIG. 3 depicts a schematic design of one embodiment of a wave energy converter with a retractable heave plate.

FIG. 3 depicts a schematic design of one embodiment of a wave energy converter system 160 with a retractable heave plate 104. Embodiments described herein aim to mitigate the risk of component, tether or system failures in extreme events by developing, improving, and potentially optimizing a survival configuration for the Triton WEC and similar WECs. Mechanisms and features incorporated into the Triton WEC and similar WECs will allow the heave plate 104 to be retracted (e.g., using the same onboard winches utilized during installation) and mated to the surface float 102 automatically when extreme wave events are encountered or anticipated. This may be designated as a survival configuration. In some embodiments, mechanisms prevent the generators from being loaded by the tethers during such conditions. Non-linear numerical system models for operational and survival mode configurations are also addressed.

Disclosed embodiments seek to overcome many of the limitations imposed on two-body point absorbers that require overdesign due to survivability in extreme waves. In a number of such WECs, spar type connections connect the surface float to a reaction structure, leading to high capital cost (i.e., high factor of safety) when compared to the flexibly connected reaction structure in the Triton WEC and similar WECs. Some embodiments achieve reduced system overdesign, ordinarily driven by the uncertainty around what constitutes 'survival' conditions and what forces might be experienced in such survival conditions.

In one embodiment power levels of 300-400 kW may be obtained under certain operating conditions (e.g., 3 m Hs, 9.1 s Tp). Other embodiments may utilize different damping and spring levels that can achieve target power levels.

In some embodiments of the present inventions, an asymmetric heave plate demonstrates significantly higher power performance and significantly lower peak loads in extreme wave cases relative to symmetric heave plates with the same mass.

Figures 4, 5:
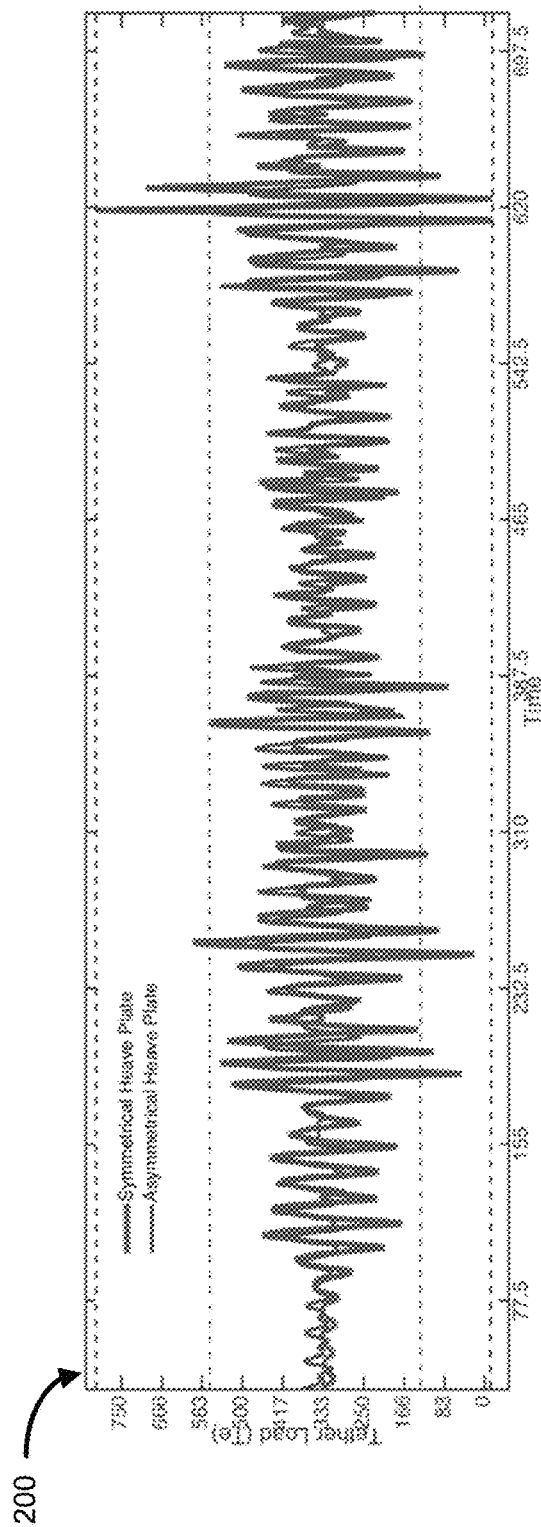
FIG. 4 depicts a wave diagram of one embodiment of tether loads over time for symmetric and asymmetric heave plates.
FIG. 5 depicts calculations of various embodiments of asymmetric heave plates for a single-tether system.

FIG. 4 depicts a wave diagram 200 of one embodiment of tether loads over time for symmetric and asymmetric heave plates. In particular, the wave diagram 200 shows a time series comparison of symmetric and asymmetric heave plates in a large (e.g., 5 m Hs, 12 s Tp) sea state showing peak load reduction with an asymmetric heave plate.

FIG. 5 depicts calculations of various embodiments of asymmetric heave plates for a single-tether system.

Figure 6:
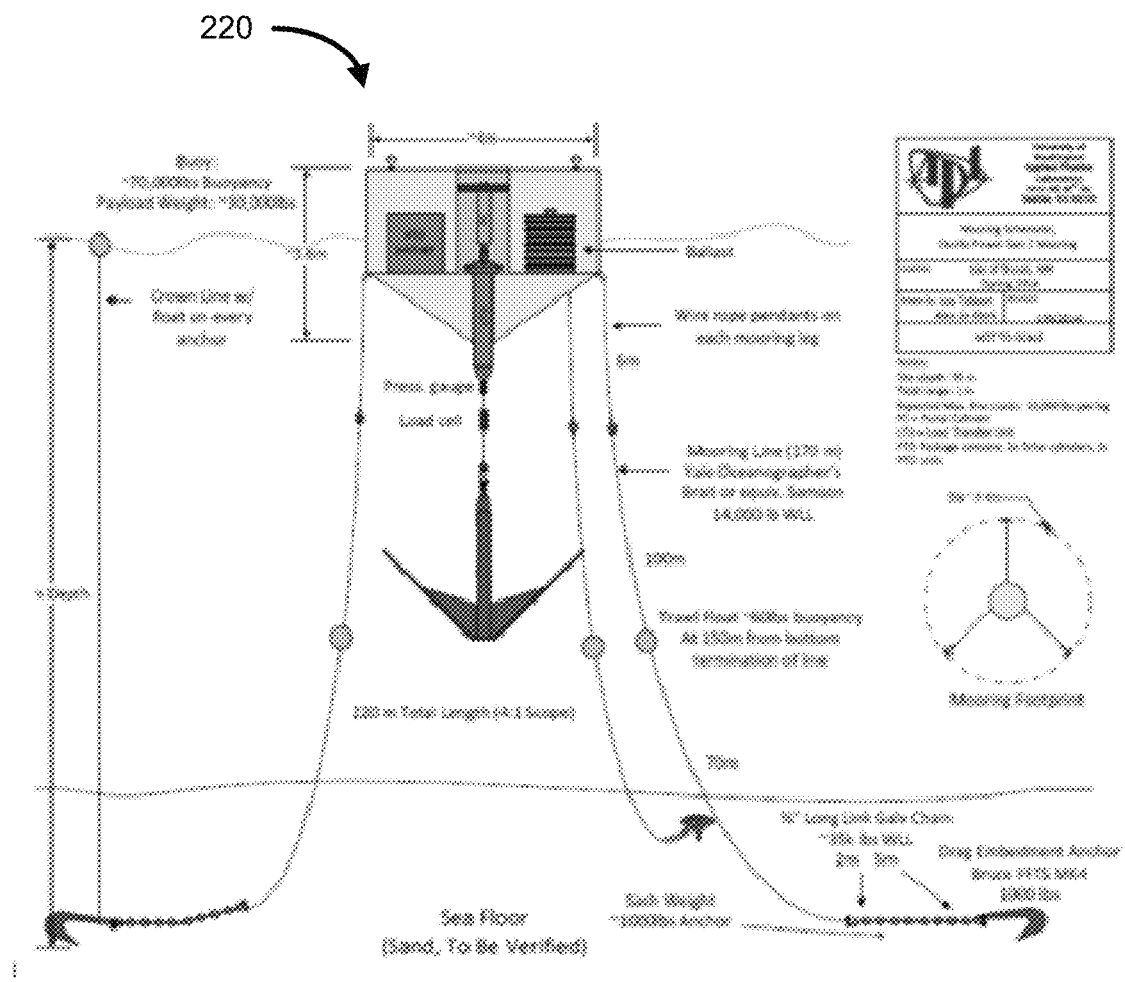
FIG. 6 depicts a schematic diagram of one embodiment of a single-tether wave energy converter system.

FIG. 6 depicts a schematic diagram of one embodiment of a single-tether wave energy converter system 220. In one embodiment, a surface float is connected to a submerged heave plate via a single flexible tether. Similar to the Triton WEC, surface waves acting on the surface float result in changing tether tension which is used to drive a magnetostrictive or other type of electric generator to produce power. In some embodiments, the surface float system may be a scaled representation of a commercial system, or a "technology demonstrator" to allow testing and de-risking of key component technologies and operational processes in a simulated or real ocean environment. In some embodiments, the surface float includes a galvanized steel core wrapped with solid foam. Lower density foam may be used internally for buoyancy, and a harder density foam may be used on the exterior to provide a resilient protection.

In some embodiments, the surface float includes a galvanized steel core wrapped with solid foam. Lower density foam may be used internally for buoyancy, and a harder density foam may be used on the exterior to provide a resilient protection.

In one embodiment of the present invention, a heave plate may be built from steel to have a submerged mass of 8,000 lb while a long central pipe enables mating with a surface float during the installation and recovery.

In one embodiment, the heave plate is lowered by a hydraulic winch located internally to the surface float, with hydraulic power to the winch being supplied, for example, by the installation vessel.

An embodiment of the system was deployed and completed a full month deployment with no major system failures despite experiencing a major storm. Recovery operations were also completed using the same vessel that was used for installation. The recovery operation was a simple reversal of the installation process, culminating in the heave plate being raised to mate with the surface float, similar to the engagement of the survival configuration described herein.

In some embodiment, the top three risks that need to be considered are listed below:

1. Tether failure: The tether may be subjected to unpredictable, extremely high loads if it is subjected to snap loading following tether slack events. The slack events may be mitigated by detailed design based on the results of detailed numerical modeling with specialized software capable of handling extreme waves, and by progressively more refined, higher scale tank testing.
2. Surface float hull failure: The surface float may fail due to extremely high localized forces caused by wave slamming. This risk can be mitigated through careful design that reduces or minimizes the risk of this failure, and also by designing to allowing localized hull failure that allows local water ingress without resulting in sinking and a total loss.
3. Extreme wave model accuracy: The results from the physical model tests may not properly represent full-scale effects, especially with regards to wave slam and non-linear effects due to the asymmetric heave plate in the two-body configuration. This risk can be mitigated by cross comparison with numerical results, while ensuring adequate safety factors are included and continuing to test the model at progressively higher scales.

Prior to OPI's development of the Triton WEC, flexible tethers have not been used to connect a float body and a reaction structure such as a heave plate, largely due to concerns with snap loading in extreme events. Through extensive modeling and scale model testing, it may be demonstrated that a WEC might operate with no such snap loads during typical operational wave conditions. While similar results can also be achieved under the most extreme conditions, doing so might require overdesign of Triton's tethers, heave plate, connections and surface float. Furthermore, the highly non-linear nature of such waves on the system makes such conditions inherently difficult to model and investigate numerically, thus reducing the confidence that such simulation results will translate into real-world outcomes. Physical model validation in appropriate facilities may be very important in determining design loads for extreme events.

This disclosure describes multiple survival mode configurations that can enable the Triton WEC and similar WECs to manage the high, unpredictable loads encountered in extreme waves, without overdesign of the system. Another such specific innovation is the clear identification of conditions where this survival mode might be engaged to prevent unnecessary system shutdown and maximize annual energy production (AEP). The levelized cost of electricity from a Triton WEC or similar WEC with an integrated survival configuration may be lower than conventional point absorbers, for some or all of the following reasons:

1. Reduced capital cost: The use of flexible tethers might have an impact on capital costs due to the elimination of spar-related structural costs. Furthermore, through the addition of a survival strategy to the baseline Triton WEC design, structural overdesign of the float and heave plate to deal with extreme loads can be reduced or minimized.
2. Extended lifetime: Use of a specific 'survival mode' in extreme sea states might reduce tether and structural failure risks and eliminate high loads on the rest of the load train will reduce the probability of overall system failure and thus extend the operating lifetime of the system.
3. Reduced costs of integration: The heave plate can be manufactured independent of the float. The tether connections are simple and can be easily made at the deployment site (as contrasted with rigidly connected heave plates).
4. Reduced transportation costs: As the heave plate does not need to be rigidly attached to the float, it can be transported independent of the float. This reduces the complexity of transporting such a two-body structure.
5. Reduced installation cost: It is commonly accepted that tow-to-site deployments reduce or minimize the installation cost for deep water WECs. For large spar-type WECs with rigid heave plates, this is a complex and slow process. The use of a flexibly tethered heave plate allows for much more versatility in the tow and installation process.
6. Improved AEP: Use of multiple tethers allows for energy capture in multiple modes (i.e., heave, pitch and roll, allowing for increased energy extraction compared to rigidly connected two-body point absorbers).

Some embodiments may allow for a reduction in system peak structural stresses by 50% or greater compared to those experienced when the heave plate is deployed in the operational configuration, while simultaneously allowing for a reduction of capital cost by 15% or greater due to the elimination of over-design to account for uncertainty.

Various embodiments (or combinations of embodiments) that can enhance survivability of WECs, including the Triton WEC, are described below:

1. Mating heave plate and surface float (with winches). When extreme conditions are forecast that exceed a certain threshold, the heave plate can be raised up to the surface float by onboard winches and then mechanically attached to the float to create a single unit. This would involve the outline design of the lifting system and the appropriate apparatus, structure or modification to the baseline design to allow the connection between structures to take place.
2. Distributing tension across lifting lines (by winch or by ratcheting lines). Another embodiment is to use the supplementary lifting/lowering lines that will be in place for installation or recovery of the heave plate, to take some of the load in the extreme case. By tensioning the lifting lines so that they take ~50% of the tether load we can potentially reduce the effective peak tether loads in half. It should also be possible to design a mechanism that would correctly tension the lines without the need for an on-board winch. One mechanism could involve a controlled latching or ratcheting of lines shorter and shorter through the natural motion of the system until they took the appropriate load. This task would look at how to implement a practical latching mechanism and the particular characteristics of the lifting lines in order to achieve the correct elasticity in order to function correctly.
3. Lifting heave plate close to surface float, without mating the two. By raising the heave plate so that it is much closer to the surface float, the water particle relative velocities reduce, potentially reducing the forces involved. However, there may be some risk of contact if the separation between heave plate and surface float is too low. Additionally, while in this configuration the lifting lines would be the only link to connect the heave plate to the surface float.
4. Submergence of surface float. This embodiment involves ballasting the floating component of a wave energy converter such that it becomes negatively buoyant and sinks below the surface. In this case, mooring floats can remain on the surface and provide a vertical restoring force to the now submerged wave energy converter such that its depth remains constant. The act of sinking the float below the surface reduces the wave loads acting on the wave energy converter allowing it to survive extremely high wave heights. A minor variation on this strategy is to provide a small reserve buoyancy to the WEC float so that it says at the surface but is mostly submerged and possibly fully submerged on occasion in very large waves. In this case the vertical restoring force for the system is shared between the mooring floats and the minimal (positive) buoyancy of the float.

It should be noted that these solutions are not mutually exclusive, and more than more than one of these variants could be considered together in combination with another variant. Such combinations might be implemented simultaneously or, alternatively, in sequence. For example, by implementing tension distribution up to some intermediate level of severity and then switching to heave plate mating in more extreme conditions, the availability of the system can be increased (since power can be produced during a tension distribution arrangement), while not compromising survivability under truly extreme conditions.

Figure 7A:
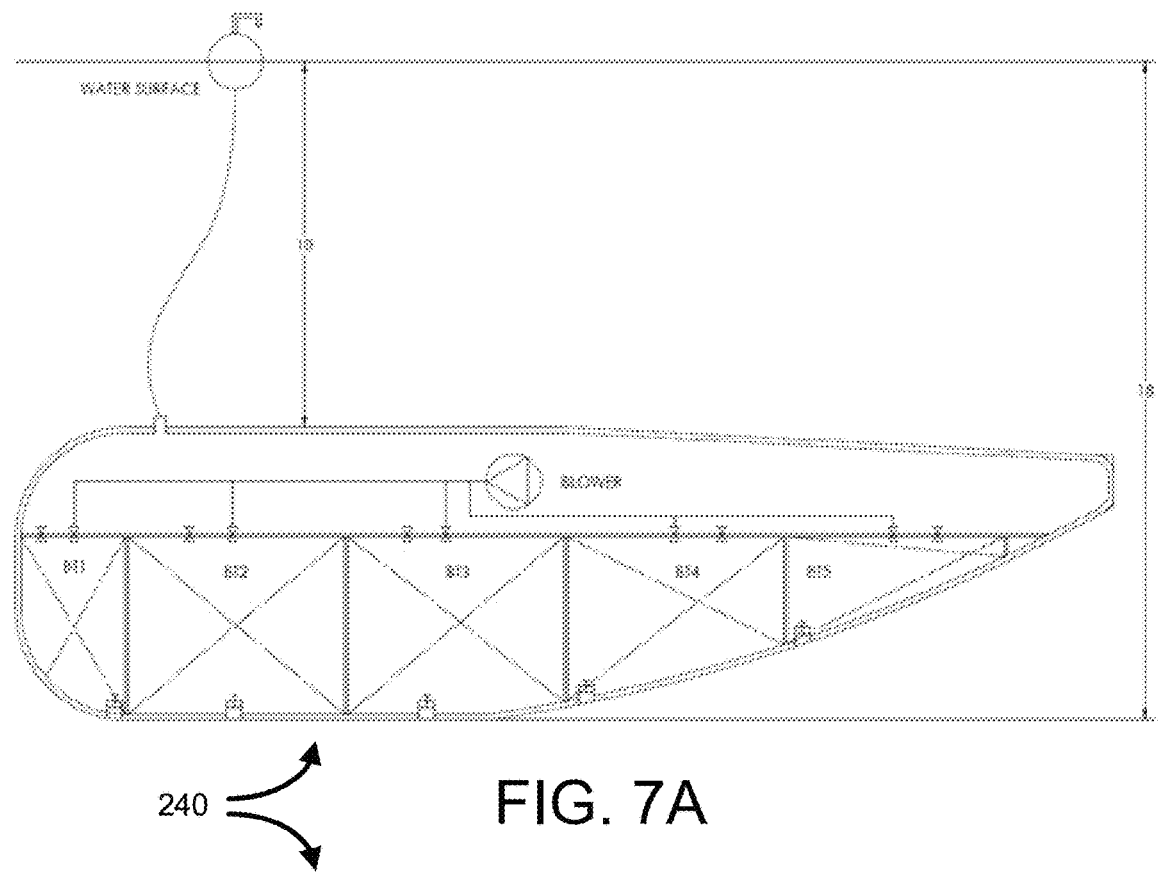
FIGS. 7A and 7B depict schematic diagrams of one embodiment of a ballasted buoy.
Figure 7B:
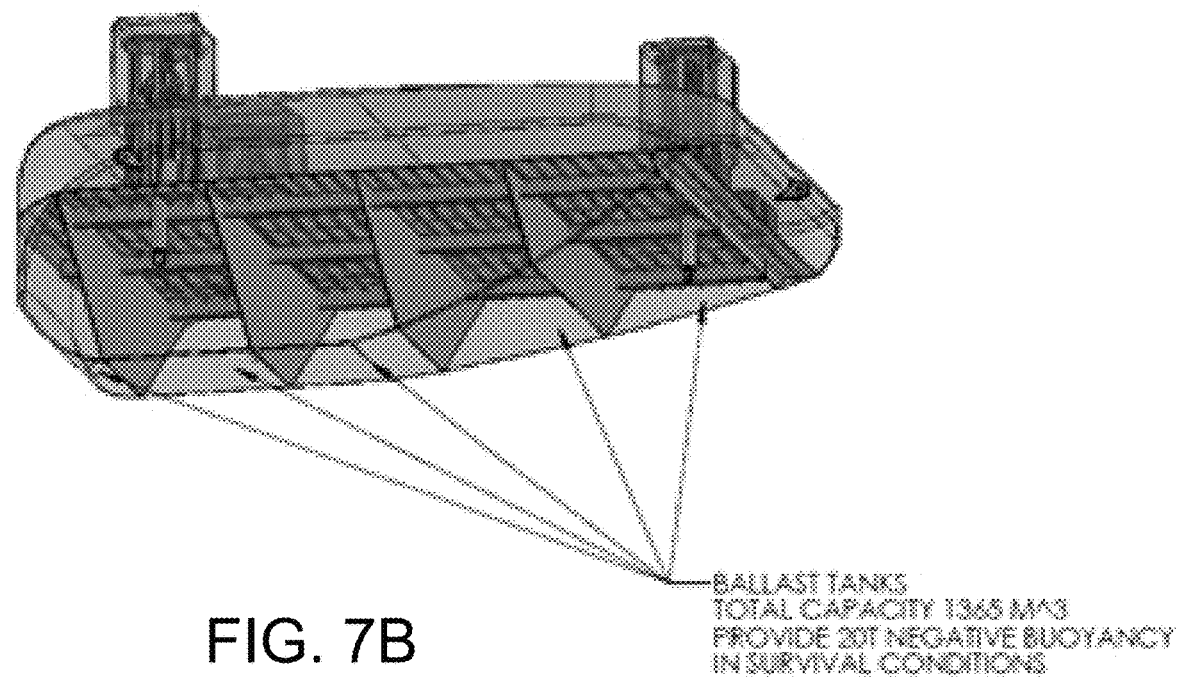

FIGS. 7A and 7B depict schematic diagrams of one embodiment of a ballasted buoy 240. In particular, FIG. 7A illustrates a schematic of ballast tanks and a basic piping and instrument arrangement, and FIG. 7B illustrates locations of ballast tanks in surface float.

In some embodiments, the ballasted buoy 240 facilitates decreased wave excitation forces on the surface float by sinking it below the surface. Moving below the surface will reduce the dynamic loads on the float and hence the tethers and drivetrain. This strategy can be implemented with ballasting, giving the entire system a few 10's of tonnes of negative buoyancy. A rough position of 10 m below the water surface was initially proposed, however some more in depth analysis is needed to determine an effective submergence depth. Oversized mooring floats can be used to maintain the submerged depth, or a (small) separately deployed float. Although this strategy appears extreme, it might require less adaptive hardware than the other two strategies and has the potential to be the simplest and lowest cost option. Sealing the float from water ingress would be somewhat straightforward using bulkheads and common marine engineering techniques.

The displaced volume of the fully submerged float may be 3260 m3, although it may be bigger or smaller as desired. For example, in some embodiments the displaced volume may be between about 1-50,000 m3. In another example, the displaced volume may be between about 1,000-10,000 m3. At that size, a ballast mass of 1390 tons is required to achieve a negative buoyancy of 20 tons. A ballast water volume of 1365 m3 will achieve the target buoyancy. This can be split up into multiple ballast tanks that fit the scheme of the structural hull arrangement and the dry volume required for the drivetrain and generator equipment. The three mooring floats will provide enough positive buoyancy to keep the system at a prescribed depth and can be designed to impart limited wave forces. A separately deployed float could also be utilized to provide the positive buoyancy.

To sink the float, in some embodiments, flood ports can be opened at the bottom of the ballast tanks while vents at the top of the ballast tanks will be vented to atmosphere to allow the air volume to escape. Once the ballast tanks are full of water the air vents will be closed while the flood ports can be left open. Once the waves return to the normal operating conditions the float will be brought back to the surface by providing air, either from a compressed on-board source or an air-line attached to a float at the surface. This pressure can be greater than the hydrostatic pressure of 180 kPa at the flood ports at 18 meter depth. An onboard compressed air tank may need to be large, but can be maintained by a small air compressor as the cycle time for entering and leaving survival mode is not expected to be less than 24 h, depending on specific configurations.

In some embodiments, the surface float may be lowered by ~10 m by ballasting the hull to achieve a small negative buoyancy. The submerged position would be supported by the mooring floats. In other embodiments, the heave plate may be lowered and sits upon the seafloor, similar to a tension leg platform. This provides the advantage of not requiring the large mooring floats to support the system in the submerged configuration and eliminating the chance of clashes between the heave plate and seafloor. However, it was generally agreed that there may be challenges and risks associated with this variant, such as controlling the rate of descent once fully flooded, environmental disturbance of the seafloor, potential damage to the heave plate during the set-down, and possible filling of the ring with sediment. The structure would also have to withstand a higher hydrostatic pressure if the heave plate is lowered all the way to the sea floor.

An advantage of this embodiment is that the risk profile of this system is no longer focused on damage during waves, but revolves around the risks of entering and exiting the strategy itself. As a result, the loads are far more controllable and predictable, meaning that it becomes much easier to mitigate and reduce risks by ensuring that the procedures and operations are comprehensive. This was agreed to be an advantage. There is added risk due to leakage around hull penetrations, but there are well known techniques to ensure these are maintained. Also, positive pressure can be maintained in important or critical compartments to ensure no water entry.

Ballast chambers would need multiple subdivisions to ensure an even lowering of system. This also might implement redundancy in case of pump or valve port failure so the surface float can be sunk when needed, however it is slightly less critical that the system is able to resurface. Additionally, it was noted that the float CoB will shift aft as the float sinks, so part of the control problem will be to ensure that the added ballast water shifts the float CoG appropriately in order to avoid drastic pitching of the hull as it sinks.

Biofouling and corrosion buildup may be an issue internally but can be monitored and effective maintenance performed in-place.

Automatic entry into the survival strategy is possible, and potentially desirable and methods may be implemented whereby based on predicted sea-conditions, the WEC may have a control system that initiates.

Mooring design may be very critical for some embodiments. The connections between the mooring floats and the submerged hull should be designed adequately, as they may undergo large ranges of motion and have high loads.

There is a risk that the time to enter the strategy will be too long, and the climate may increase dangerously before being implemented. It therefore may be important to ensure that the design accounts for this.

It may be important to also consider the potential benefits (i.e. increased AEP) that can be enabled by using the ballast system during operational conditions.

As noted previously, for this survival mode, the design loads are likely to be driven by large operational seas rather than survival mode seas.

This embodiment may be suitable as it is expected to be relatively low overall cost. The cost drivers for this strategy are:

1. Minor additional structure to resist hydrostatic pressure from airtight compartments
2. Maintaining watertight integrity
3. Additional compartmentalization to ensure even ballasting when sinking.

Figure 7C:
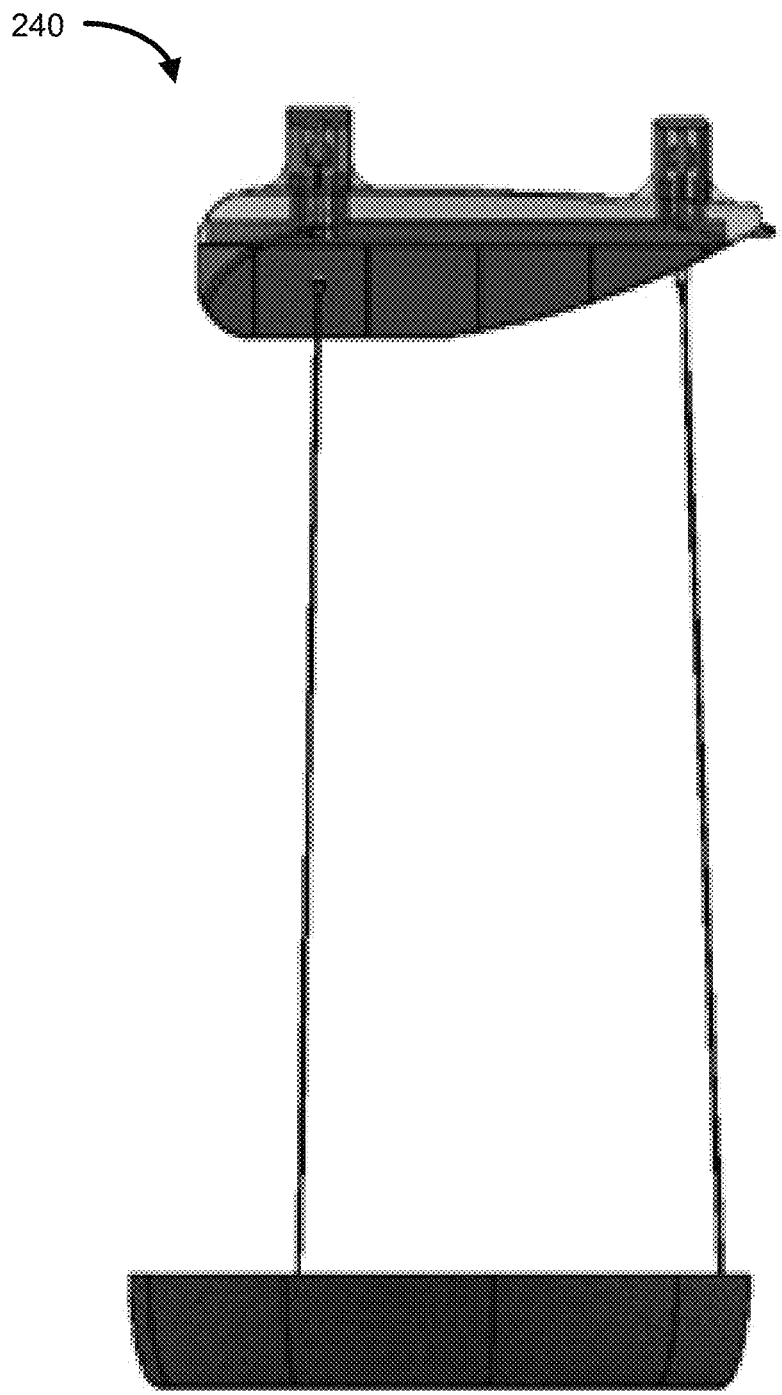
FIG. 7C depicts a schematic diagram of a wave energy converter with the ballasted buoy of FIG. 7A and an asymmetric heave plate.

FIG. 7C depicts a schematic diagram of a wave energy converter with the ballasted buoy of FIG. 7A and an asymmetric heave plate. In the illustrated embodiment, a heave plate is deployed from the ballasted buoy.

Figure 7D:
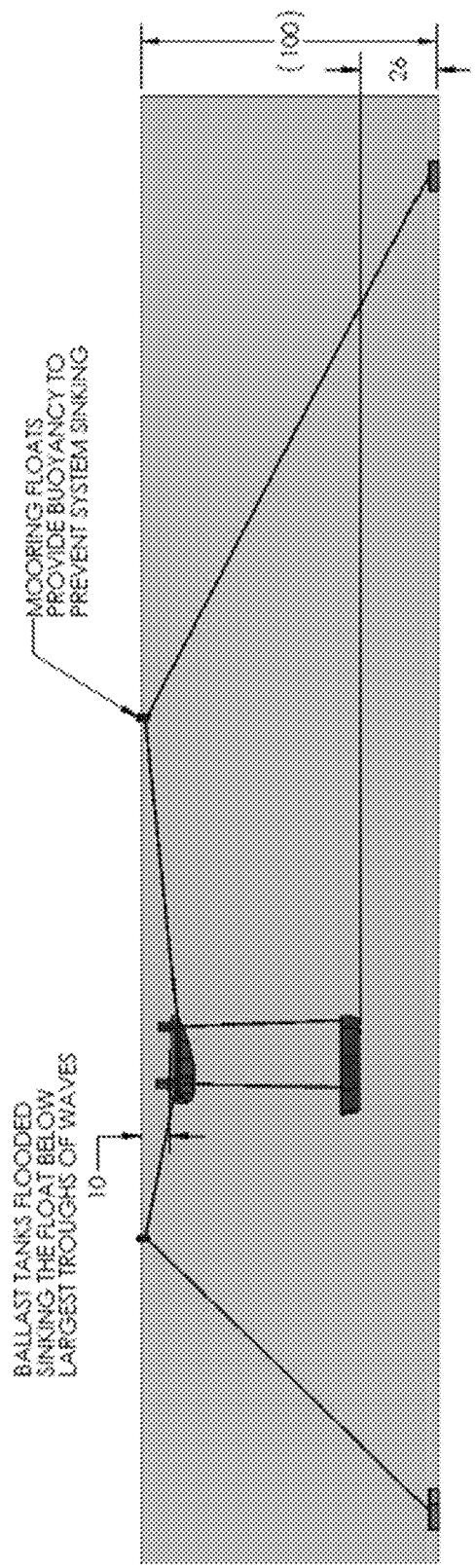
FIG. 7D depicts a schematic diagram of one embodiment of a deployment arrangement of the wave energy converter of FIG. 7C.

FIG. 7D depicts a schematic diagram of one embodiment of a deployment arrangement of the wave energy converter of FIG. 7C. Wave conditions used for the evaluation of extreme condition scenarios designated as EC1-EC5 are noted in Table 1 below.

TABLE 1

Design wave conditions sampled from the 50-yr contour

| Label | $T_e$ [s] | $H_s$ [m] |
| --- | --- | --- |
| EC1 | 5.5 | 2.9 |
| EC2 | 7.6 | 4.9 |
| EC3 | 10.1 | 6.8 |
| EC4 | 13.0 | 8.7 |
| EC5 | 15.1 | 9.6 |

Figure 8C:
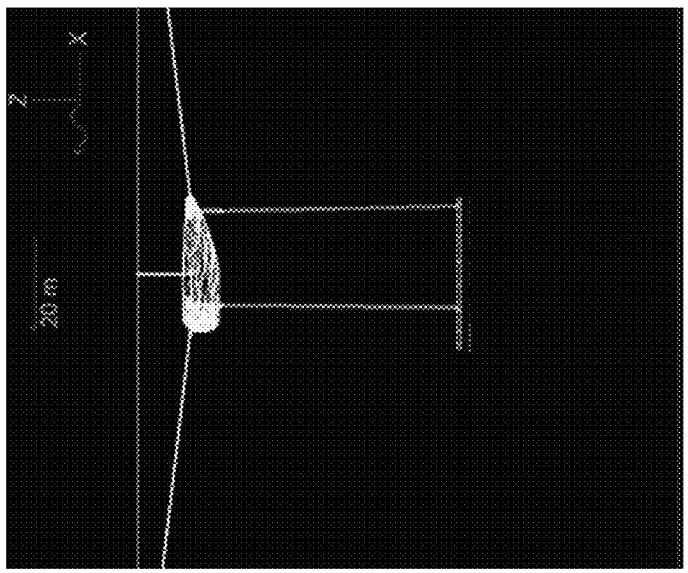
FIGS. 8A-C depict various embodiments of design analysis models for survival deployments of a wave energy converter.
Figure 8B:
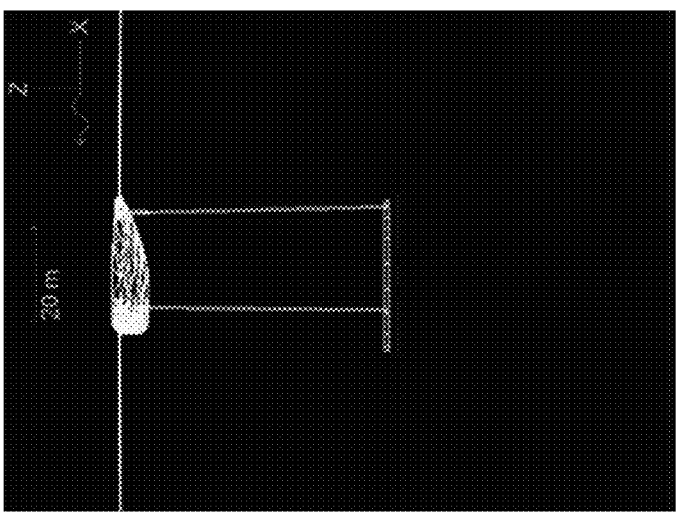
Figure 8A:
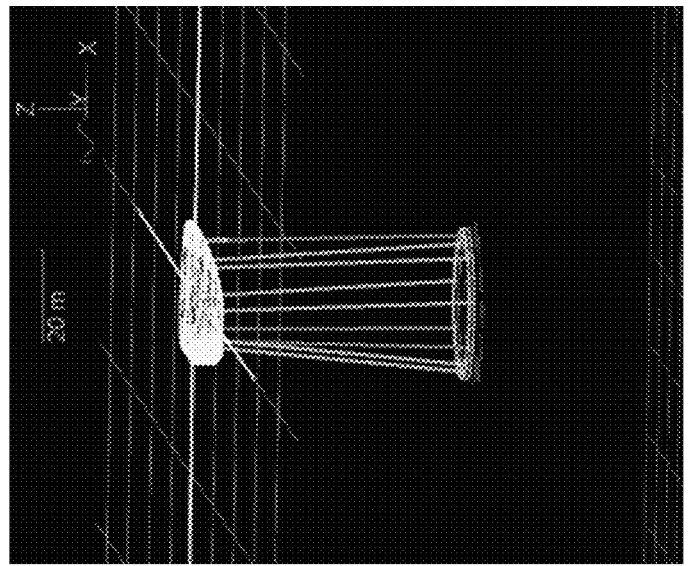
Figure 9A:
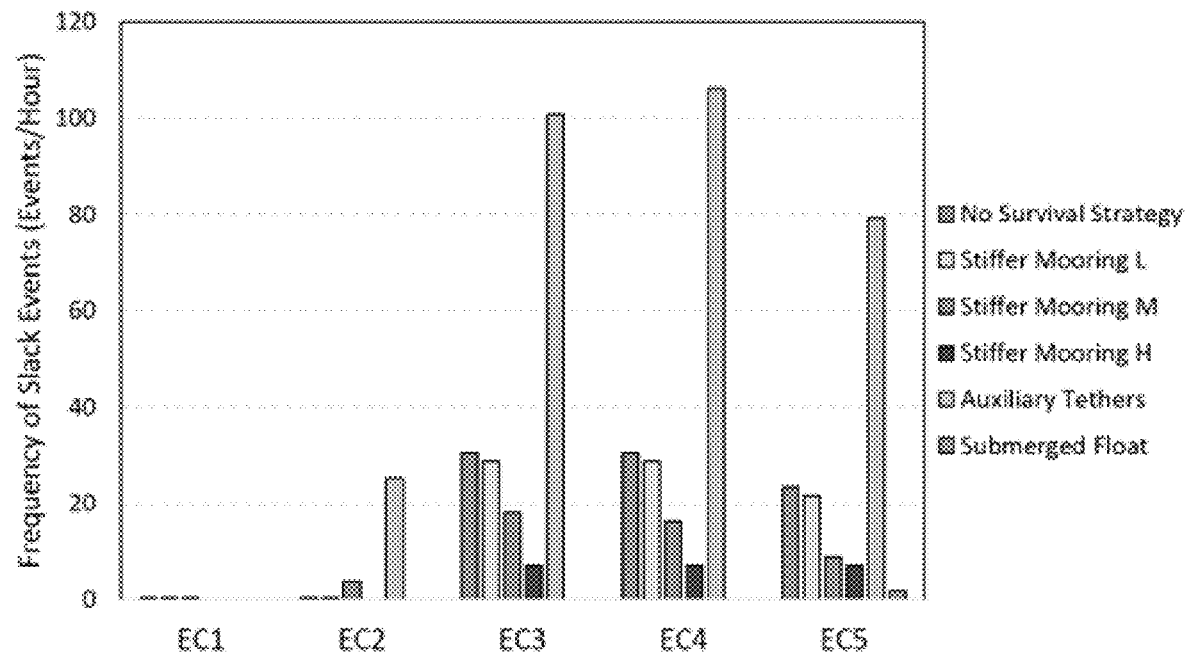
FIGS. 9A-D depict graphical representations of various potential drivetrain settings for a deployed wave energy converter.
Figure 9B:
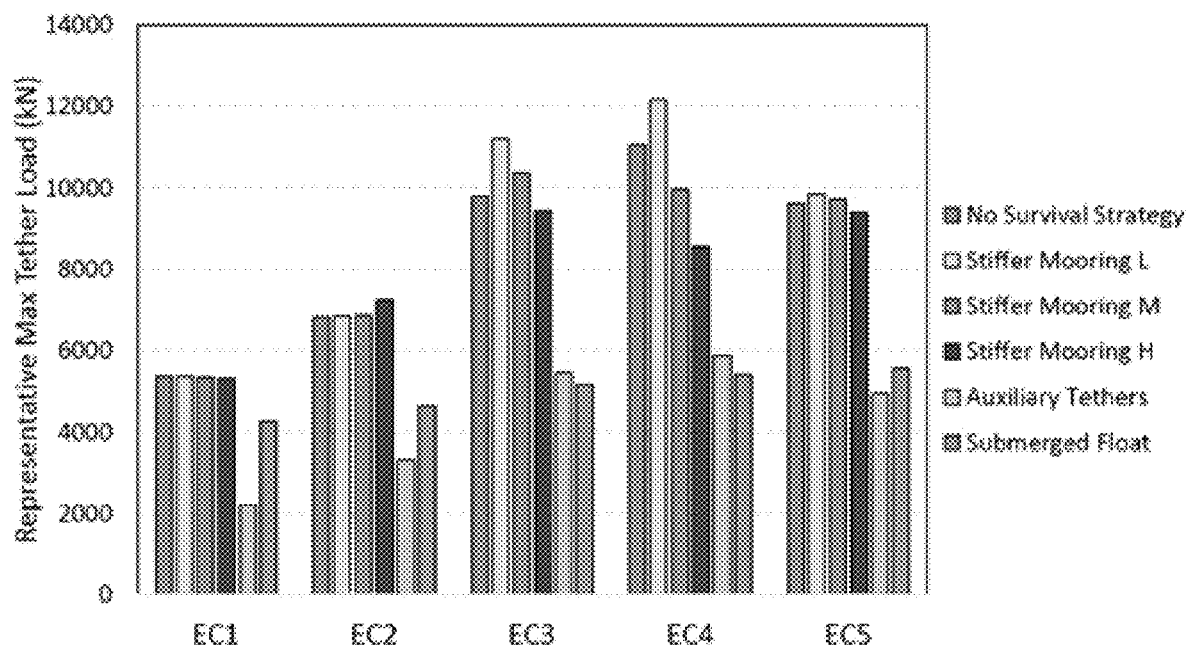
Figure 9C:
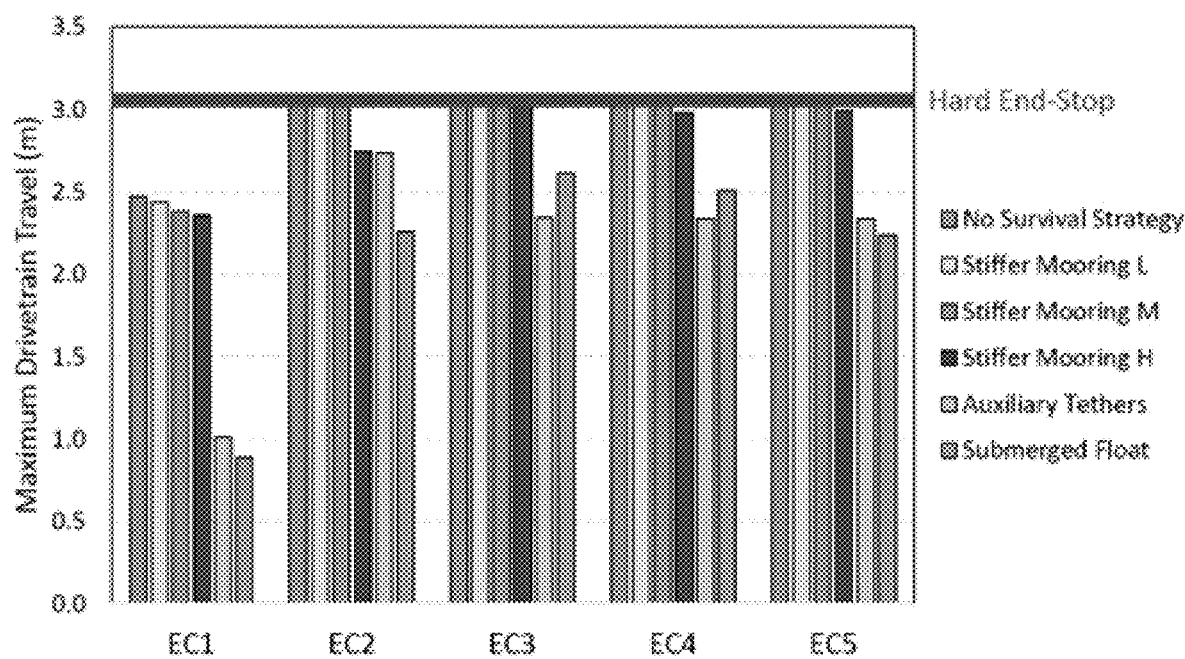
Figure 9D:
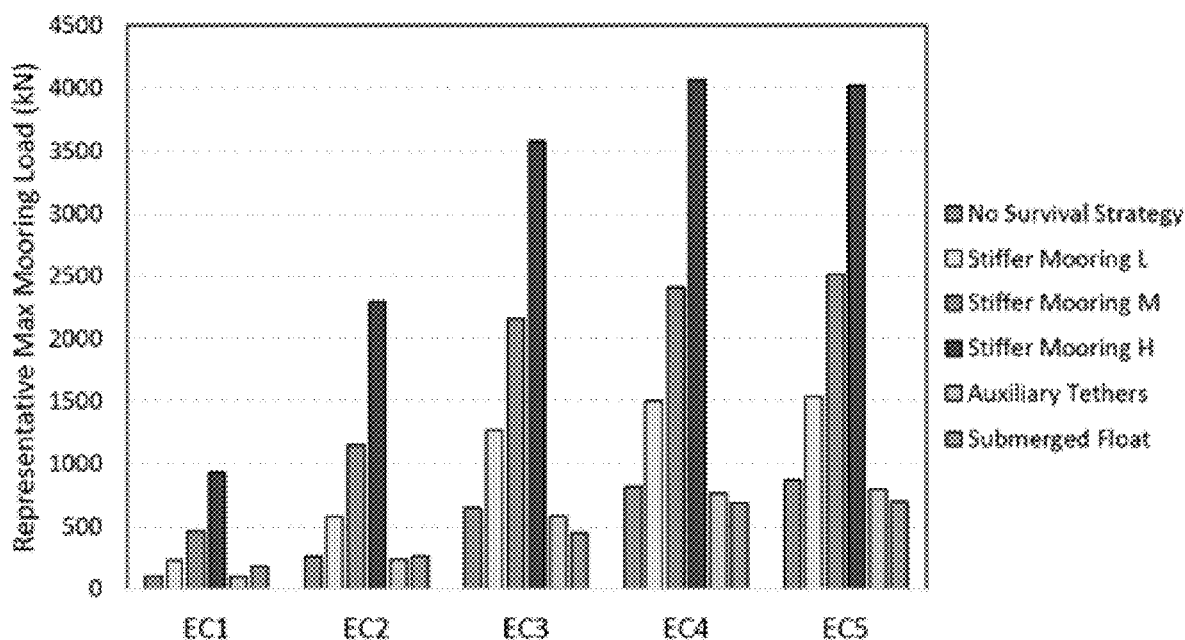

FIGS. 8A-C depict various embodiments of design analysis models for survival deployments of a wave energy converter. There are at least four relevant metrics that allow a generalized comparison between the survival strategies with specific focus on system reliability and structural loads (note that for the moment, the simulations are currently only in 0 degree long crested waves, so the front tether will be representative of the worst case):

1. Frequency of slack events: i.e. slack events/hour, using the front tether as a proxy (which is typically most severely affected).
2. Representative maximum tether load: the average of the 20 largest tension peaks in the front tether.
3. Maximum drivetrain travel: the peak-to-peak stroke of the front tether.
4. Representative maximum mooring load: the average of the 20 largest tension peaks in the front mooring line.

FIGS. 9A-D depict graphical representations of various potential drivetrain settings for a deployed wave energy converter. For each survival mode and wave condition, nine different drivetrain configurations encompass a realistically achievable range of spring/damper settings. The data points summarized in the figures represent the most favorable drivetrain setting, which results from a balance between reducing or minimizing slack event frequency, peak stroke, and peak tether loads. These loads do not consider any fault cases, which could be examined in more detail at a later stage.

Figure 10:
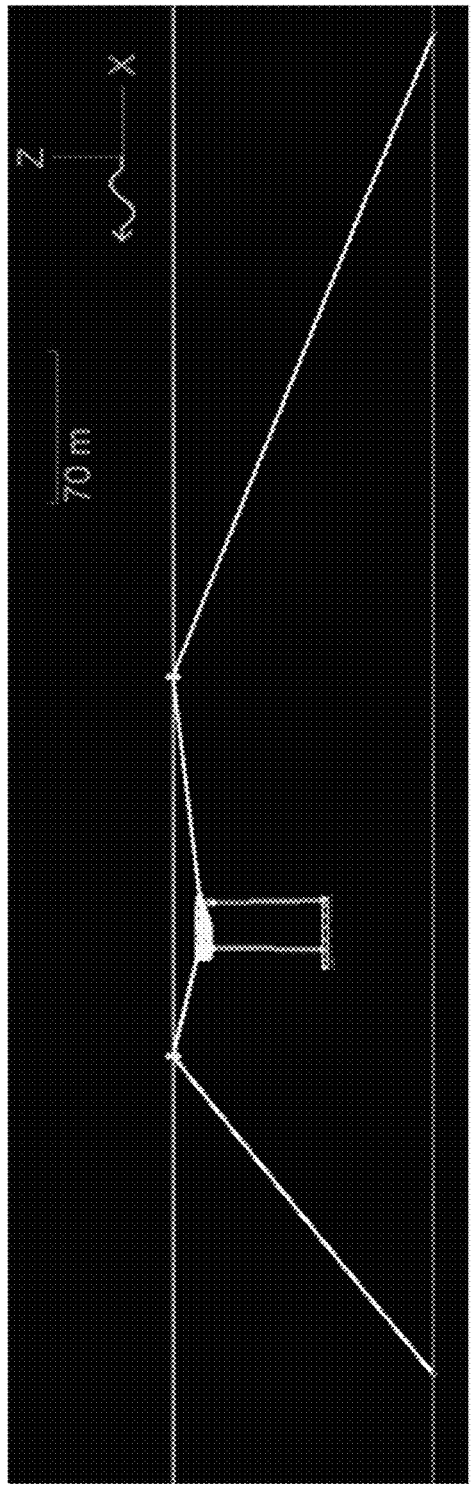
FIGS. 10 and 11 depict embodiments of deployed wave energy converter systems having different upper line segments and line material stiffnesses.
Figure 11:
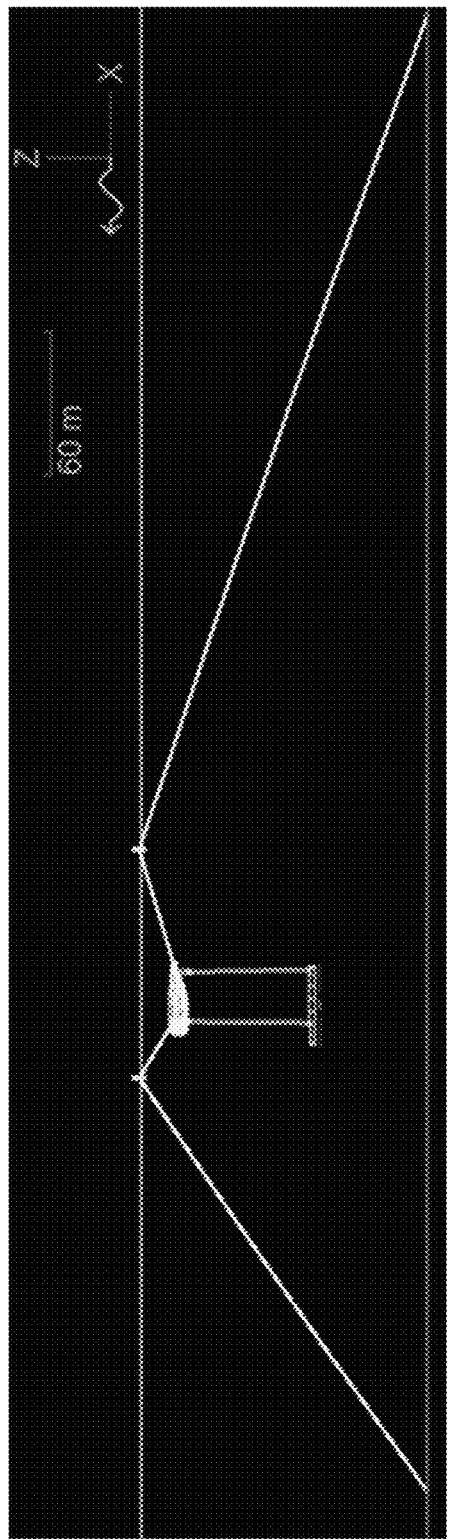

FIGS. 10 and 11 depict embodiments of deployed wave energy converter systems having different upper line segments and line material stiffnesses. Using a dynamic analysis model, there are embodiments of a realistic 3-point mooring design capable of supporting the submerged WEC. The primary driver of the hull structural cost is the maximum submergence depth, and associated hydrostatic pressure loads, experienced in survival mode.

In some embodiments, different mooring designs might reduce or minimize the hull submergence in the largest 50-year wave. Simulations suggest using shorter upper line segments and higher line material stiffness (e.g., UHMPE compared to polyester) to reduce the maximum submergence by providing a larger effective vertical restoring force on the WEC. In particular, FIG. 10 illustrates a design analysis model of a baseline submerged survival configuration (100 m upper lines, 4" Polyester). FIG. 11 illustrates a design analysis model of an improved submerged survival configuration (50 m upper lines, 2.5" UHMPE).

FIG. 12A depicts one embodiment of wave diagrams for design simulations of the deployment arrangement shown in FIG. 10. In particular, FIG. 12A illustrates design analysis simulations of submerged configuration in extreme condition EC5.

FIG. 12B depicts one embodiment of wave diagrams for design simulations of the deployment arrangement shown in FIG. 11. In particular, FIG. 12B illustrates a design analysis simulation of an improved mooring configuration shown in FIG. 11.

The numerical model was also used to evaluate the maximum tether and mooring loads experienced in survival mode under 50-year waves. As shown in Table 2, these loads are smaller in magnitude to those experienced during large waves in operational mode. Therefore, a conclusion is that the design tether and mooring loads are set by the maximum operational waves, whereas the design hydrostatic pressure loads are driven by largest waves in survival mode.

TABLE 2

Example of maximum tether and mooring loads in one embodiment of survival configuration along the 50-year contour

| Label | Te [s] | Hs [m] | Max Tether Force [Te] | Max Mooring Force [Te] |
|---|---|---|---|---|
| EC1 | 5.5 | 2.9 | 445 | 63 |
| EC2 | 7.6 | 4.9 | 452 | 65 |
| EC3 | 10.1 | 6.8 | 467 | 68 |
| EC4 | 13.0 | 8.7 | 486 | 79 |
| EC5 | 15.1 | 9.6 | 499 | 78 |

Figures 13A, 13B:
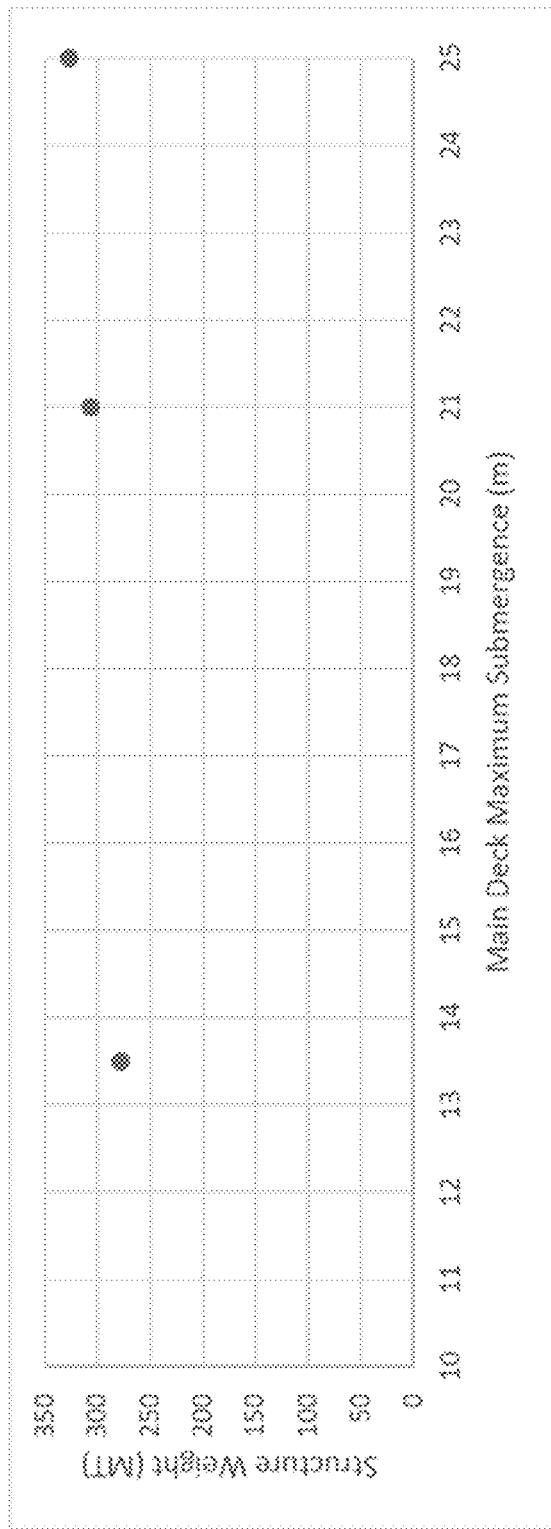
FIGS. 13A and 13B depict different embodiments of steel structural cost versus maximum submergence depth.

FIGS. 13A and 13B depict different embodiments of steel structural cost versus maximum submergence depth. The structural loads on the hull are dominated by the hydrostatic loads in the submerged survival configuration. FIG. 13 indicates how the submergence depth impacts the cost.

For some embodiments, recent physical model tests indicate that the maximum submergence of the hull will be 22 m indicating an approximate structure mass of about 310 MT, although this may be more or less for other WEC designs. However, the results also indicate that we may be able to improve the strategy in order to reduce the maximum submergence depth.

Figure 14A:
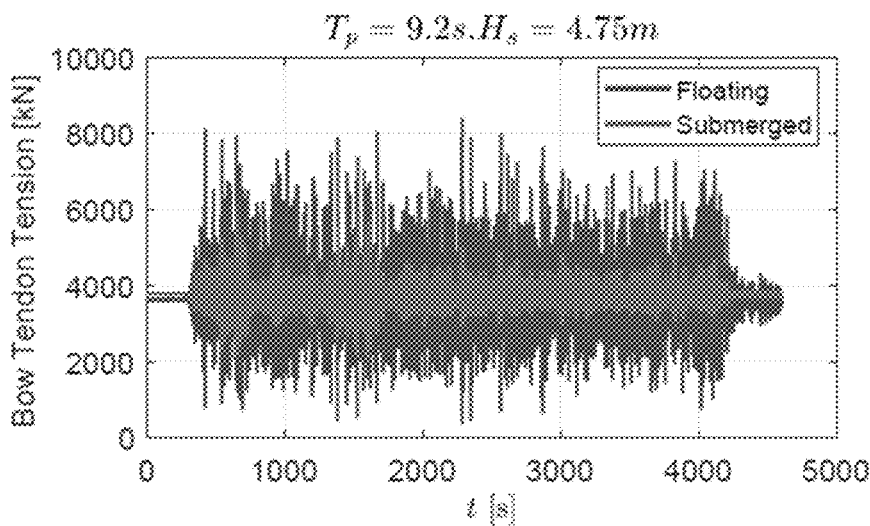
FIGS. 14A-C depict various wave diagrams of performance metrics for a ballasted float deployed on the surface of a wave tank.
Figure 14B:
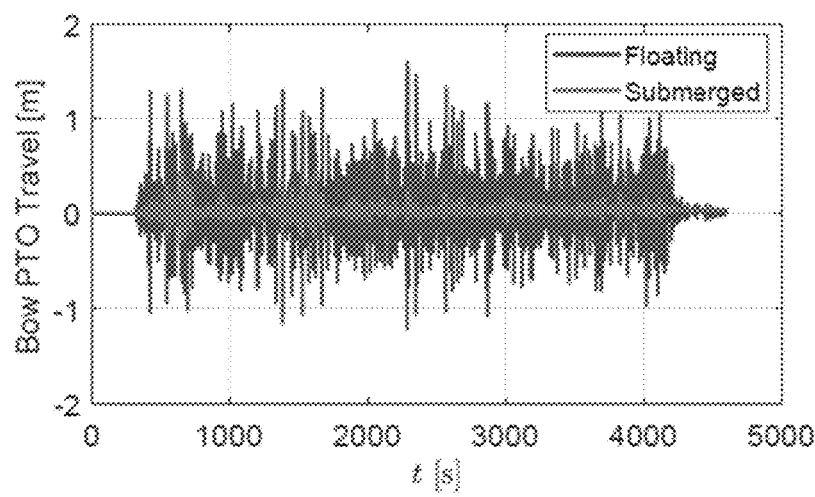
Figure 14C:
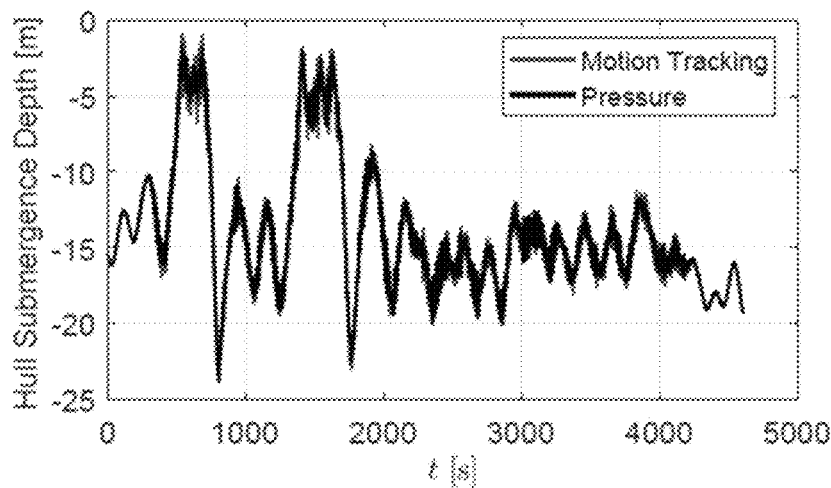
Figure 15A:
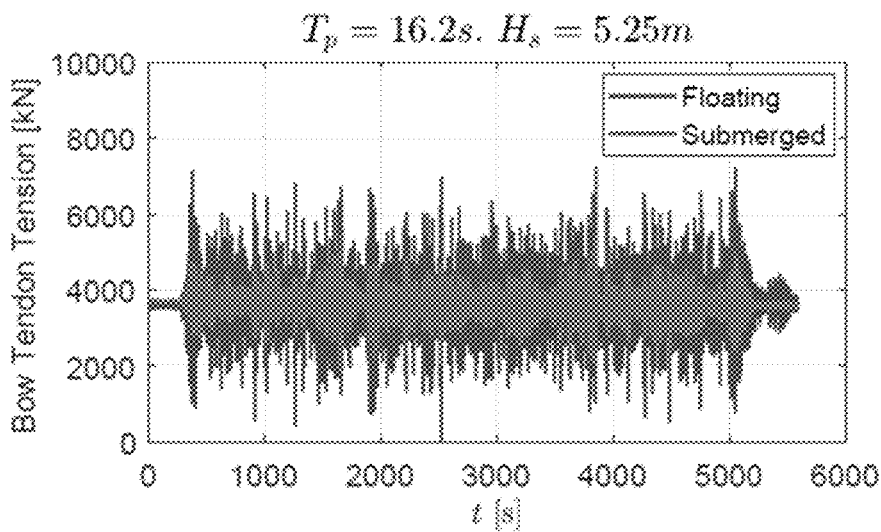
FIGS. 15A-c depict various wave diagrams of performance metrics for a ballasted float deployed below the surface of a wave tank.
Figure 15B:
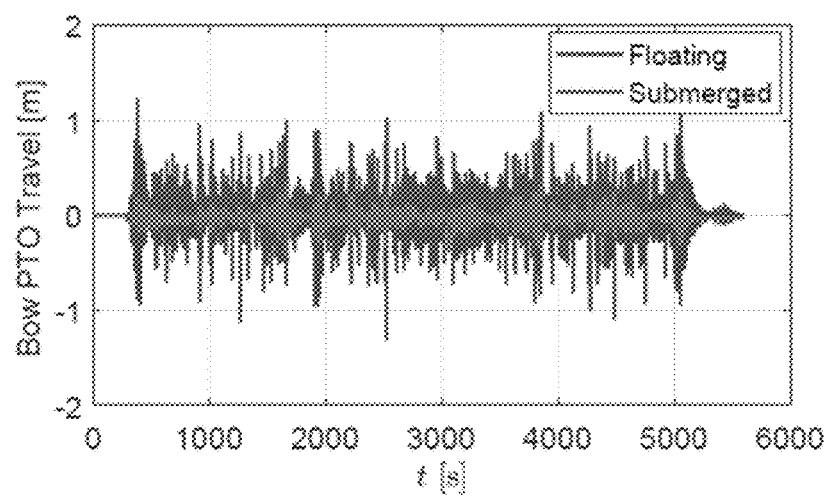
Figure 15C:
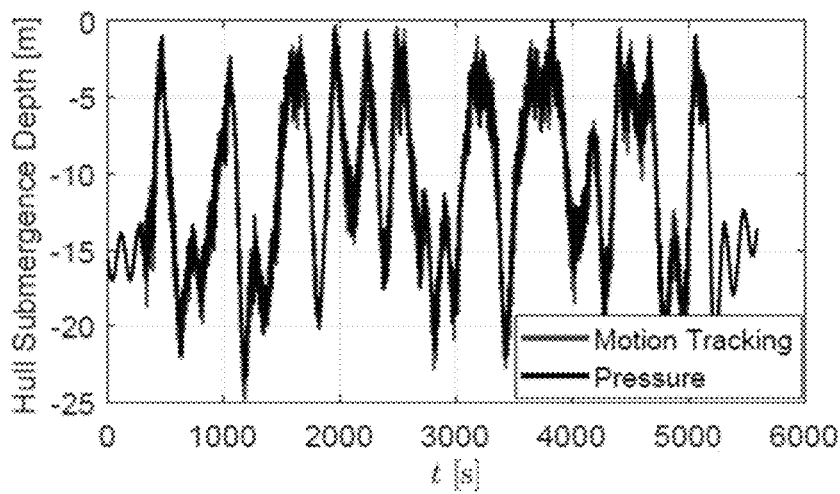
Figure 16A:
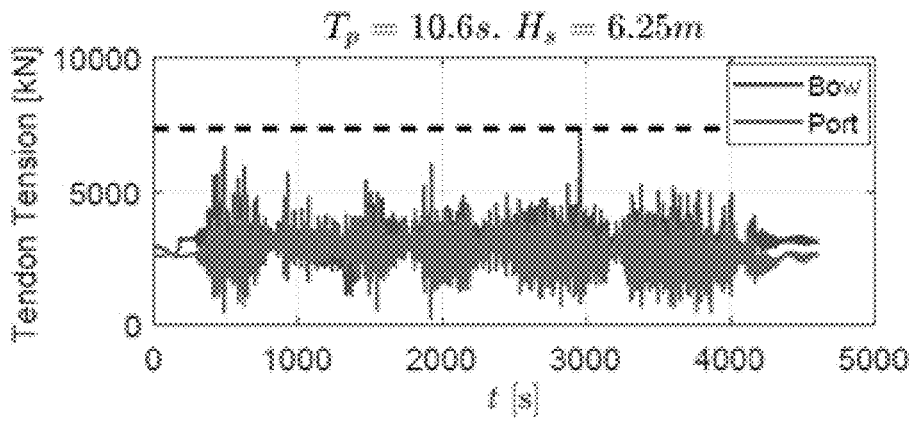
FIGS. 16A-D depict various wave diagrams of performance metrics for an embodiment of a wave energy converter in a first scenario of simulated 1:50 year waves.
Figure 16B:
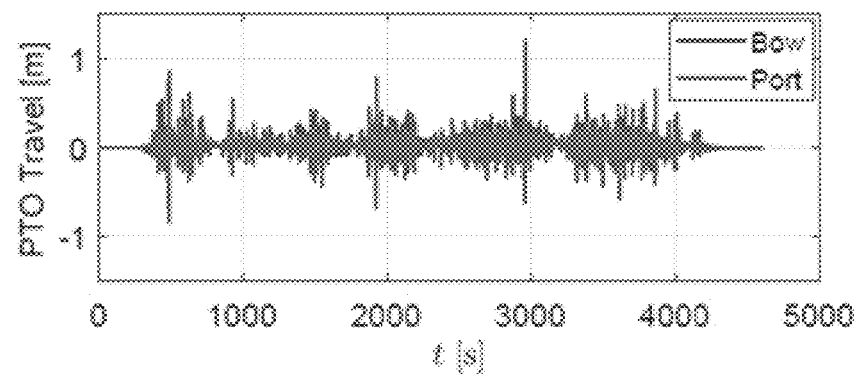
Figure 16C:
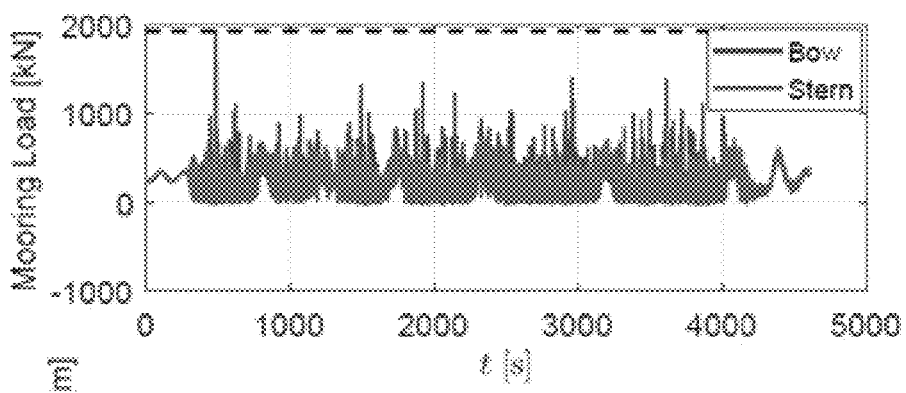
Figure 16D:
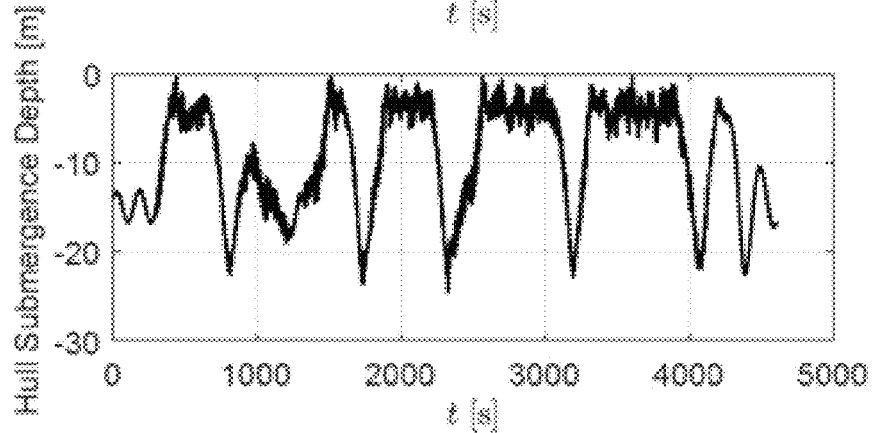
Figure 17A:
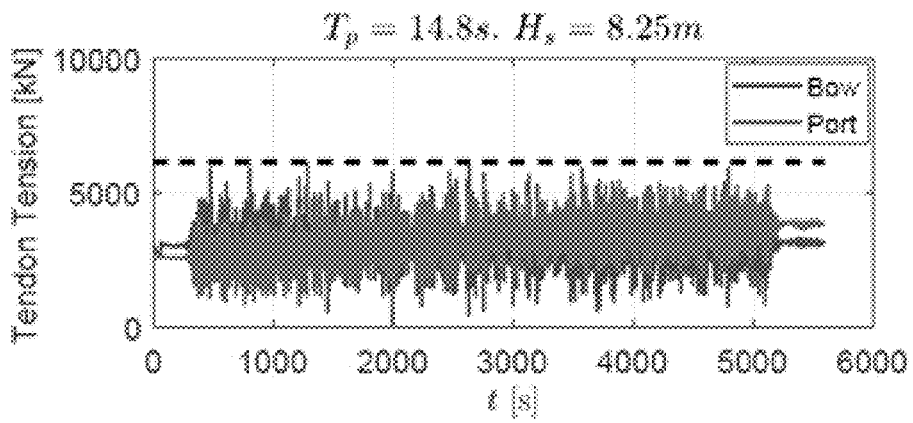
FIGS. 17A-D depict various wave diagrams of performance metrics for an embodiment of a wave energy converter in a second scenario of simulated 1:50 year waves.
Figure 17B:
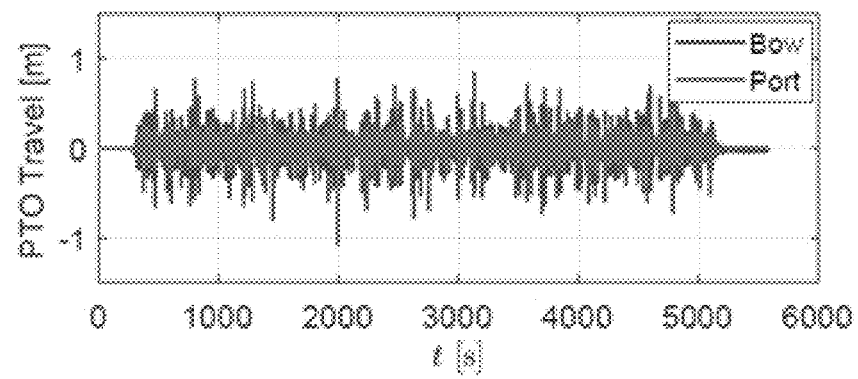
Figure 17C:
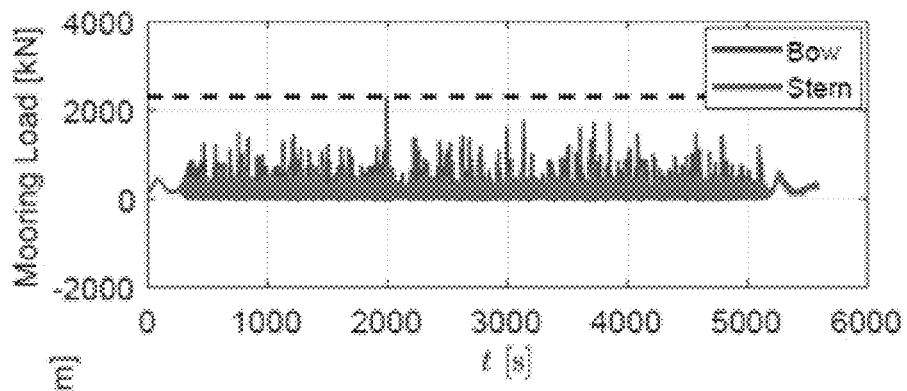
Figure 17D:
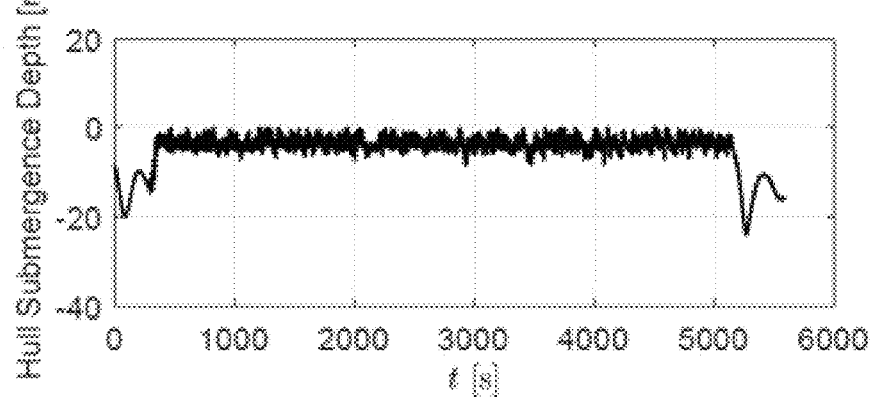
Figure 18A:
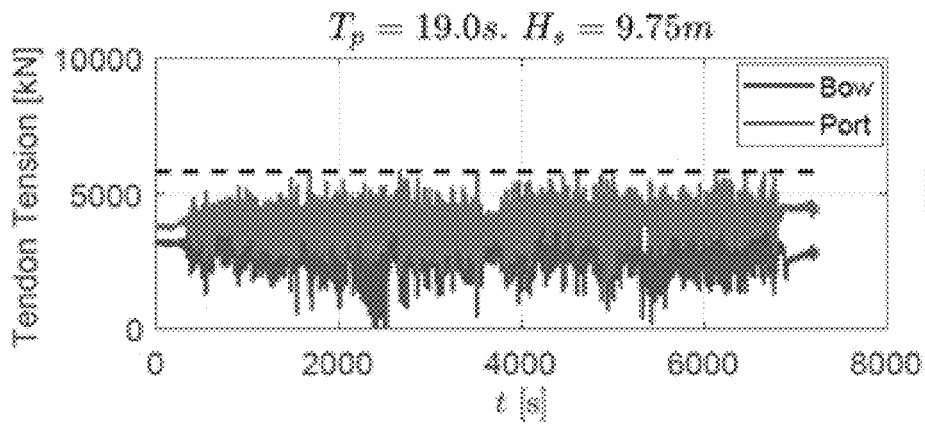
FIGS. 18A-D depict various wave diagrams of performance metrics for an embodiment of a wave energy converter in a third scenario of simulated 1:50 year waves.
Figure 18B:
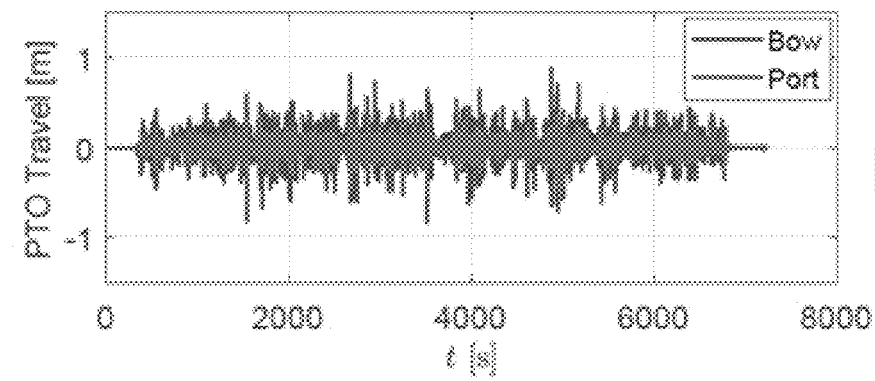
Figure 18C:
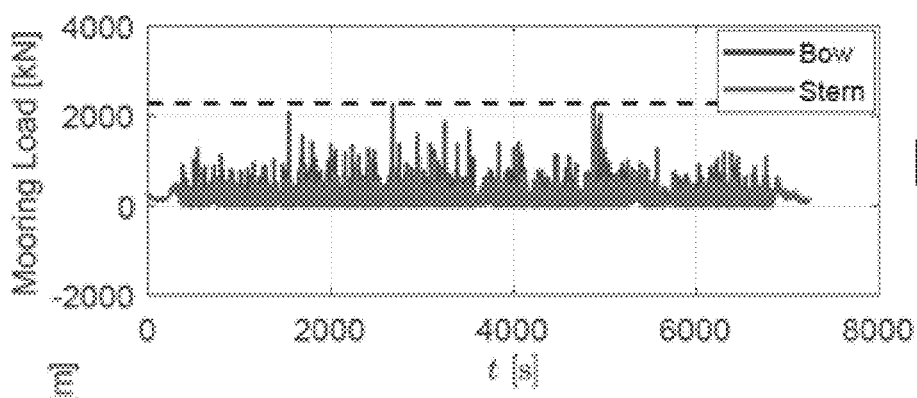
Figure 18D:
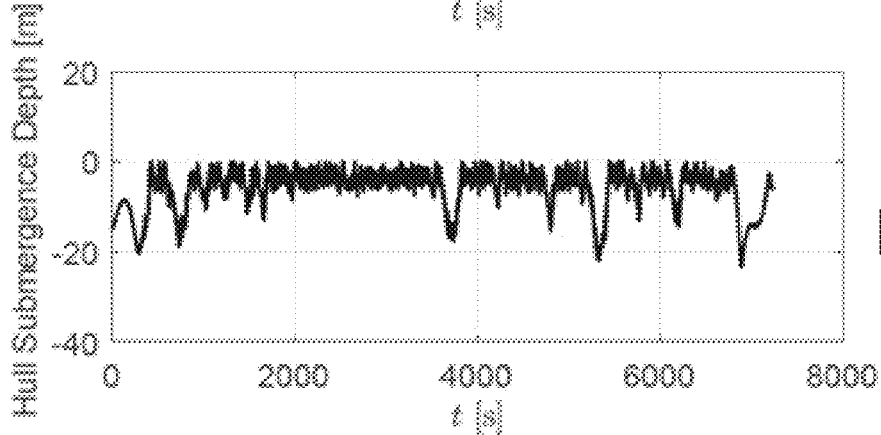

FIGS. 14A-C depict various wave diagrams of performance metrics for a ballasted float deployed on the surface of a wave tank. FIGS. 15A-C depict various wave diagrams of performance metrics for another ballasted float deployed below the surface of the wave tank. For two of the same three wave conditions, FIGS. 14A-C and 15A-C compare the performance when the system is floating versus submerged. It is clear that sinking the system below the surface detunes the system, resulting in lower tendon tensions and drivetrain travel. As summarized in Table 3, on average, the maximum tendon tension fluctuation reduced by 50% and the maximum PTO travel reduced by 70%, in some embodiments.

TABLE 3

Physical model results for floating (operational) model versus submerged (survival) mode.

| Quantity | Configuration | Test # | Value | % Reduction |
|---|---|---|---|---|
| $T_p$ = 9.2 s, $H_s$ = 4.75 m | | | | |
| Bow Tendon Tension Fluctuation, peak-to-peak [kN] | Floating | WT16 | 8030 | |
| | Submerged | WT23 | 3960 | 51% |
| Bow PTO Displacement Fluctuation, peak-to-peak [m] | Floating | WT16 | 2.82 | |
| | Submerged | WT23 | 0.92 | 67% |
| $T_p$ = 16.2 s, $H_s$ = 5.25 m | | | | |
| Bow Tendon Tension Fluctuation, peak-to-peak [kN] | Floating | WT17 | 7160 | |
| | Submerged | WT24 | 3560 | 50% |
| Bow PTO Displacement Fluctuation, peak-to-peak [m] | Floating | WT17 | 2.54 | |
| | Submerged | WT24 | 0.73 | 71% |

Also shown are time traces of the hull depth when in submerged survival mode. The hull depth was measured using two different methods. The first method is an optical measurement using the PhaseSpace motion capture system. The second method relies on inferring the hull depth from the hydrostatic pressure measured by one of the pressure transducers. The two methods are compared and demonstrate excellent agreement.

When the system is submerged, there is a clear correlation between the level of system loading and submergence depth. This is particularly clear for Tp=9.2 s, Hs=4.75 m at t=500 s and 1500 s as shown in FIGS. 14A-C. The tension and displacement fluctuations are higher when the hull is closer to the surface. It can be seen that there is attenuation of system response even for modest (<5 m) submergence depths.

Another observation is that the submerged system vertically oscillates with a very slow period, on the order of 200 s, consistent with observations from OrcaFlex design analysis. This is due to the large system inertia coupled with the soft vertical restoring spring provided by the mooring. The maximum submergence depth, on the order of 20-25 m, is in line with predictions provided by OrcaFlex design analysis. Understanding this effect further, and improving the mooring so as to mitigate, will be a key direction for future research.

FIGS. 16A-D depict various wave diagrams of performance metrics for an embodiment of a wave energy converter in a first scenario of simulated 1:50 year waves. These figures show WEC performance in survival mode in 1:50 year waves. It can be seen that embodiments of the system are able to survive these waves with no end-stop events (i.e., the PTO travel is within 3 m) and reduced or minimal slack events.

Interestingly, in these larger waves, the system appears to migrate towards the surface and tends to stay there, with a submergence of only a few meters. This effect is likely due to second order mean drift loads, which were not previously accounted for and will need to be investigated further in order to improve the fidelity of the numerical model. It is likely that this effect is responsible for the discrepancy in mooring loads (compared to the numerical model) in the 1:50 year waves.

This behavior is in contrast to the smaller waves where the system experiences dramatic variations in submergence depth. This is presumably because the second order mean drift forces only become substantial enough in the larger waves.

FIGS. 17A-D depict various wave diagrams of performance metrics for an embodiment of a wave energy converter in a second scenario of simulated 1:50 year waves.

FIGS. 18A-D depict various wave diagrams of performance metrics for an embodiment of a wave energy converter in a third scenario of simulated 1:50 year waves.

Embodiments of components of the systems described herein might be coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Additionally, some or all of the functionality described herein might be implemented via one or more controllers, processors, or other computing devices. For example, a controller might be implemented to control the mooring lines, the tether(s), the survivability mode(s) and simultaneous or sequential implementations of the survivability modes.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wave energy conversion (WEC) system comprising:
   a float body configured to float on or at a surface of a body of water, said float body comprising one or more ballast chambers of sufficient size to hold enough ballast for the float body to achieve negative buoyancy to submerge beneath the water surface in response to a survivability event;
   a heave plate;
   at least one tether coupling the heave plate to the float body; and
   a controller to control the at least one tether between survivability modes, wherein each survivability mode adjusts a tension and/or length of the at least one tether.

2. The system of claim 1, wherein the controller is further configured to at least partially submerge the float body below the surface of the body of water in response to a determination of a survivability event.

3. The system of claim 1, wherein the survivability event comprises a change in wave conditions.

4. The system of claim 1, wherein the survivability event comprises an anticipated change in wave conditions.

5. The system of claim 1, further comprising a compressor to pump air into the one or more ballast chambers to evacuate water from the one or more ballast chambers.

6. The system of claim 1, wherein the controller is further configured to control the at least one tether in response to a determination of a survivability event.

7. The system of claim 1, wherein the heave plate comprises an asymmetric heave plate.

8. The system of claim 1, further comprising at least one mooring float coupled to the float body, a buoyancy of said mooring float and a length of said coupling configured to prevent the float body from submerging lower than a predetermined maximum submergence depth.

9. The system of claim 8, wherein the mooring float provides a positive buoyancy substantially equal to a negative buoyancy of the float body when the float body reaches a predetermined maximum submergence depth.

10. The system of claim 8, wherein the maximum submergence depth of the float body is between about 1 meter and about 25 meters.

* * * * *